United States Patent
Walker et al.

(10) Patent No.: US 12,373,455 B1
(45) Date of Patent: Jul. 29, 2025

(54) VARIABLE DATA SOURCE DYNAMIC AND AUTOMATIC INGESTION AND AUDITING PLATFORM APPARATUSES, METHODS AND SYSTEMS

(71) Applicant: Omnicom Media Group Holdings Inc., New York, NY (US)

(72) Inventors: Sarah Walker, New York, NY (US); Eric Whitney, Delaware, OH (US); Karl Huckel, New York, NY (US)

(73) Assignee: Omnicom Media Group Holdings Inc., New York, NY (US)

( * ) Notice: Subject to any disclaimer, the term of this patent is extended or adjusted under 35 U.S.C. 154(b) by 0 days.

(21) Appl. No.: 17/858,118

(22) Filed: Jul. 6, 2022

Related U.S. Application Data

(63) Continuation of application No. 15/042,857, filed on Feb. 12, 2016, now Pat. No. 11,386,107.
(Continued)

(51) Int. Cl.
  *G06F 16/25* (2019.01)
  *G06F 16/21* (2019.01)
  *G06F 16/22* (2019.01)

(52) U.S. Cl.
  CPC .......... *G06F 16/254* (2019.01); *G06F 16/211* (2019.01); *G06F 16/221* (2019.01); *G06F 16/252* (2019.01)

(58) Field of Classification Search
  CPC .... G06F 16/211; G06F 16/221; G06F 16/252; G06F 16/254
  See application file for complete search history.

(56) References Cited

U.S. PATENT DOCUMENTS

| | | |
|---|---|---|
| 8,103,616 B2 | 1/2012 | Kers |
| 8,731,966 B2 | 5/2014 | Breitenstein |

(Continued)

FOREIGN PATENT DOCUMENTS

| | | |
|---|---|---|
| EP | 1862925 | 12/2007 |
| WO | 2015/192091 | 12/2015 |

OTHER PUBLICATIONS https://www.google.com/url?sa=t&rct=j&q=&esrc=s&source=web&cd=2&ved=0ahUKEwjgovTgk6LKAhWD4iYKHS7FCVYQFggjMAE&url=https://www.asug.com/discussions/servlet/JiveServlet/previewBody/39184-102-1-56638/0210 Enhance your Analytics Using Logical Data Warehouse and Data Virtualization Through SAP HANA Smart Data Access.pdf&usg=AFQjCNGqXgL4akMYZLpskLU_99kLV356tA&cad=rja visited Jan. 11, 2016.

*Primary Examiner* — Taelor Kim
(74) *Attorney, Agent, or Firm* — Hanchuk Kheit LLP.; Walter G. Hanchuk

(57) ABSTRACT

The Variable Data Source Dynamic and Automatic Ingestion and Auditing Platform Apparatuses, Methods and Systems ("DIAP") transforms file upload request, external data request, and analytics request inputs via DIAP components into clean data, metadata data sets, visualization module output, and audit notification outputs. A data ingest request is obtained via a user interface. A data file to ingest is obtained and processed to generate a clean file. A database table with a unique name is created and data in the clean file loaded into the database table. A metadata data set identifier is generated. Table columns from the database table to include into the metadata data set are determined, and the metadata data set is generated. The metadata data set links columns from the database table to analytics engine UI
(Continued)

EXEMPLARY DIAP DATA FLOW elements, and columns are associated with audit trail data via the metadata data set identifier.

17 Claims, 18 Drawing Sheets

Related U.S. Application Data

(60) Provisional application No. 62/116,271, filed on Feb. 13, 2015.

(56) References Cited

U.S. PATENT DOCUMENTS

| | | | |
|---|---|---|---|
| 8,788,464 B1* | 7/2014 | Lola | G06F 16/278 |
| | | | 707/661 |
| 9,015,238 B1 | 4/2015 | Anton | |
| 9,092,502 B1 | 7/2015 | Cannaliato | |
| 9,105,001 B2 | 8/2015 | Hampapur | |
| 2007/0283417 A1* | 12/2007 | Smolen | G06F 16/2308 |
| | | | 726/2 |
| 2014/0136472 A1* | 5/2014 | Frafjord | G06F 16/254 |
| | | | 707/602 |
| 2014/0279834 A1 | 9/2014 | Tsirogiannis | |
| 2014/0279838 A1 | 9/2014 | Tsirogiannis | |
| 2015/0347542 A1 | 8/2015 | Sullivan | |
| 2015/0347540 A1* | 12/2015 | Singh | G06F 16/254 |
| | | | 707/602 |
| 2017/0011093 A1* | 1/2017 | LeCompte | G06F 16/2471 |

\* cited by examiner

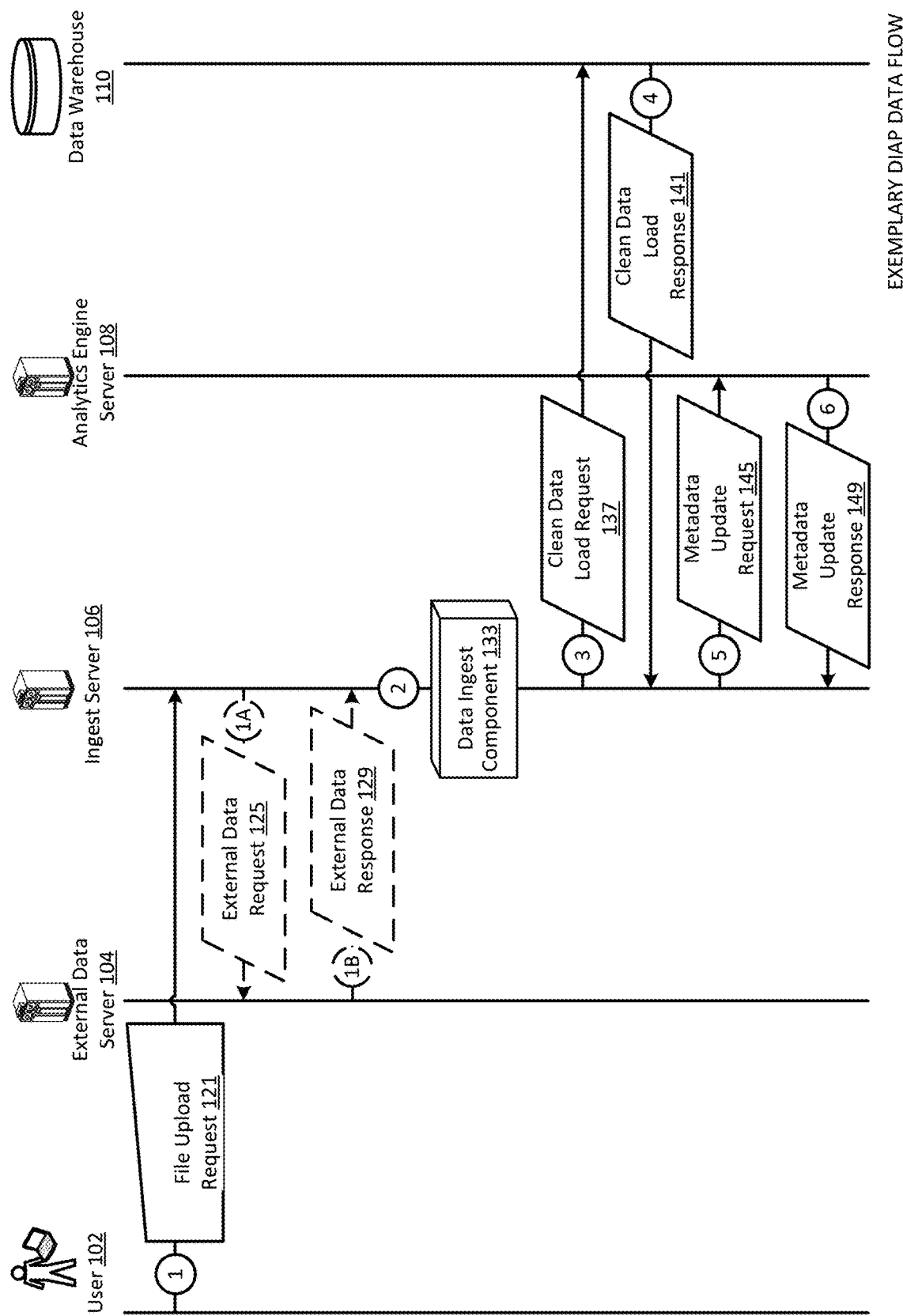
FIGURE 1A — EXEMPLARY DIAP DATA FLOW

EXEMPLARY DIAP ANALYTICS ENGINE (AE) COMPONENT

EXEMPLARY DIAP WAREHOUSE

EXEMPLARY DIAP FILE OUTPUT

EXEMPLARY DIAP COPY TO S3 AND LOAD TO REDSHIFT

FIGURE 10 — EXEMPLARY DIAP USER INTERFACES

EXEMPLARY DIAP USER INTERFACES AND DATASTRUCTURE

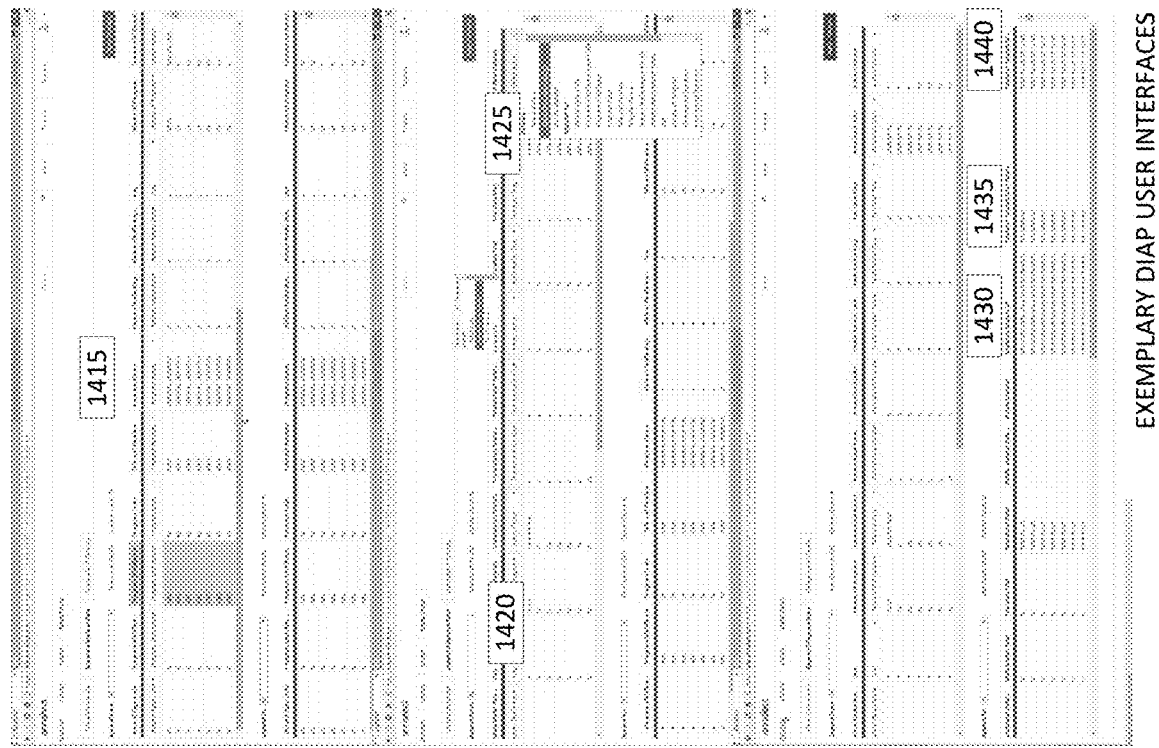
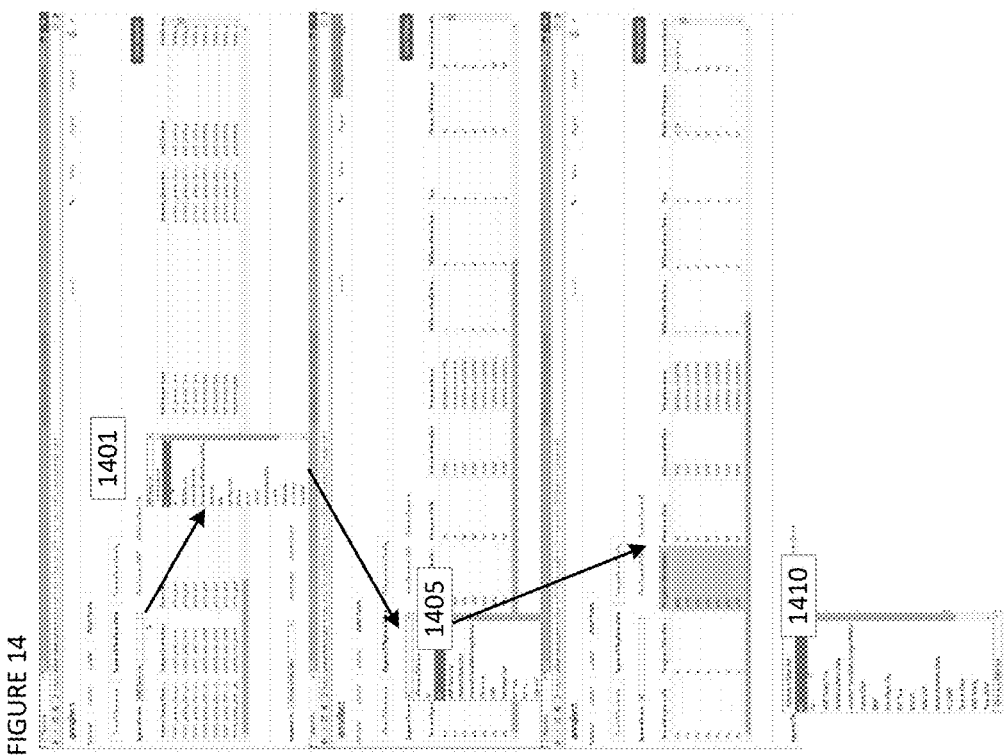
FIGURE 14

FIGURE 15 — EXEMPLARY DIAP USER INTERFACES

EXEMPLARY DIAP DATASTRUCTURE CODE AND USER INTERFACE INTERACTION

ABLE DATA SOURCE DYNAMIC AND AUTOMATIC INGESTION AND AUDITING PLATFORM APPARATUSES, METHODS AND SYSTEMS

PRIORITY CLAIM

Applicant hereby claims benefit to priority under § 120 as a continuation of U.S. application Ser. No. 15/042,857, filed Feb. 12, 2016, entitled "Variable Data Source Dynamic and Automatic Ingestion and Auditing Platform Apparatuses, Methods and Systems," which in turn claims benefit to priority under 35 USC § 119 as a non-provisional conversion of: U.S. provisional patent application Ser. No. 62/116,271, filed Feb. 13, 2015, entitled "Variable Data Source Dynamic and Automatic Ingestion and Auditing Platform Apparatuses, Methods and Systems,".

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

PRIORITY CLAIM

Applicant hereby claims benefit to priority under 35 USC § 119 as a non-provisional conversion of: U.S. provisional patent application Ser. No. 62/116,271, filed Feb. 13, 2015, entitled "Variable Data Source Dynamic and Automatic Ingestion and Auditing Platform Apparatuses, Methods and Systems,".

The entire contents of the aforementioned applications are herein expressly incorporated by reference.

FIELD

The present innovations generally address database technology, and more particularly, include Variable Data Source Dynamic and Automatic Ingestion and Auditing Platform Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Electronic databases can store information in electronic records. Relational databases store information in database tables having interrelated fields storing records.

BRIEF DESCRIPTION OF THE DRAWINGS

Appendices and/or drawings illustrating various, non-limiting, example, innovative aspects of the Variable Data Source Dynamic and Automatic Ingestion and Auditing Platform Apparatuses, Methods and Systems (hereinafter "DIAP") disclosure, include:

FIGS. 1A-1B show a datagraph diagram illustrating embodiments of a data flow for the DIAP;

FIGS. 9-16 show block diagrams illustrating screenshot user interfaces and datastructure embodiments for the DIAP.

Figure 1B:
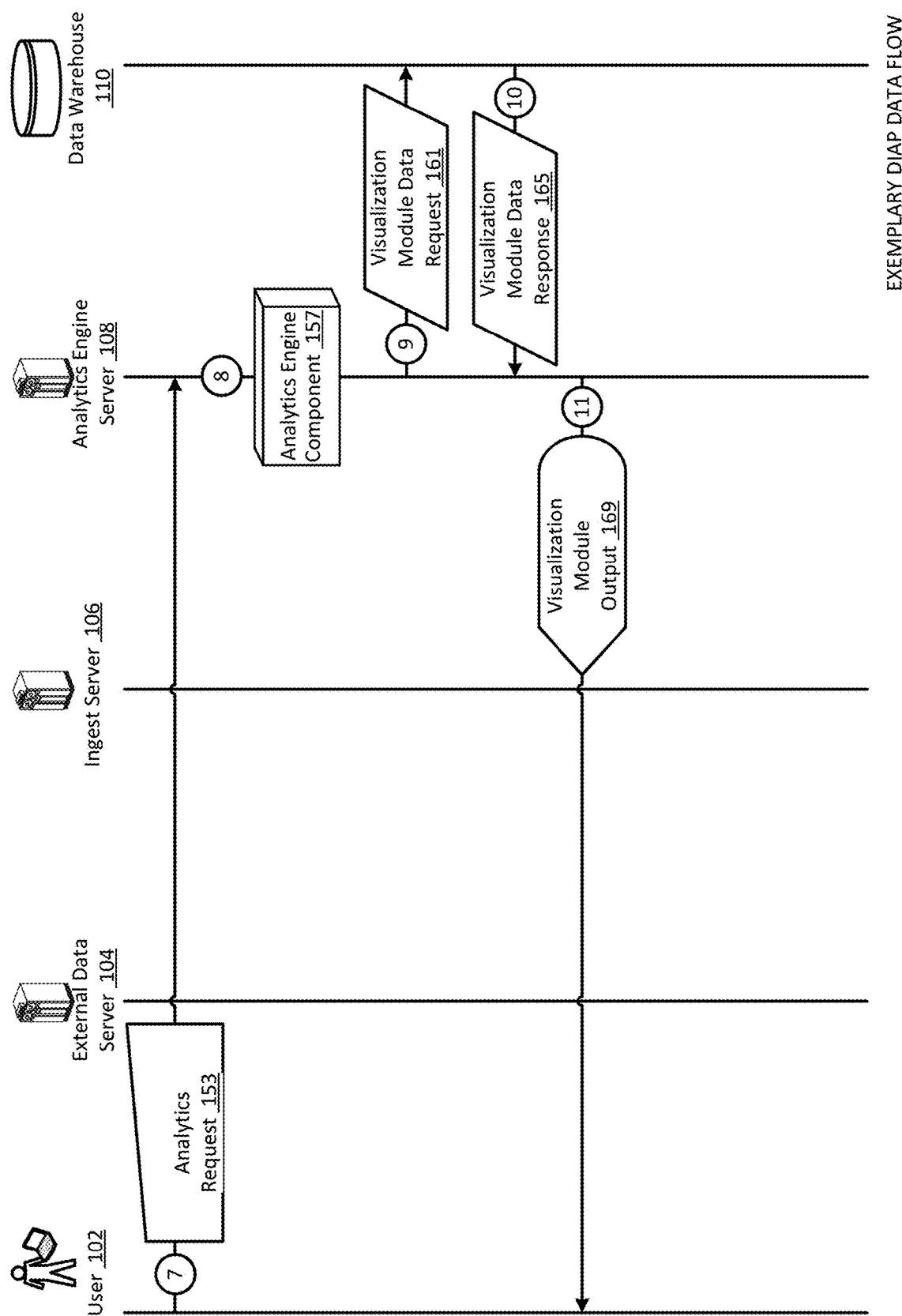

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citation and/or reference numbers are not necessarily sequences but rather just example orders that may be rearranged and other orders are contemplated.

DETAILED DESCRIPTION

The Variable Data Source Dynamic and Automatic Ingestion and Auditing Platform Apparatuses, Methods and Systems (hereinafter "DIAP") transforms file upload request, external data request, and analytics request inputs, via DIAP components (e.g., DI, AE, etc. components), into clean data, metadata data sets, visualization module output, and audit notification outputs. The DIAP components, in various embodiments, implement advantageous features as set forth below.

Introduction

The DIAP can dynamically determine the construct parameters of variable data sources, dynamically harmonize the sources so as to ingest data and make it interchangeable with other data sources. Further, the DIAP allows for auditing of the data constructs and ingested data and prevents and discerns tampering as it does not require and may restrict manual alteration of resulting data constructs, data structures and ingested data. In one embodiment, the DIAP includes data warehouse templates that allow users to assemble custom, a la carte data marts of $3^{rd}$ party content, customer-owned public content (social), and proprietary content with no programming. In addition, the DIAP provides data-now, model-as-you-go, data marts and analytics. This is a 180 degree flip from all traditional business information systems, which begin with attempting to encapsulate all of the future needs in a comprehensive data model, and then plod through the process of harmonizing the disparate source data and populating the model, which is typically unusable until fully populated and productionalized. The "model-as-you-go" approach begins with loading the data, making it immediately usable, and then addressing relationships and harmonization after the system is already delivering value to users. In addition, the DIAP provides a database abstraction and meta-data-based data storage. In a traditional database, objects are named explicitly and persistently, so the tables of "customers" and "sales" are referenced directly. Users and applications reference these tables by name, and interact with them directly, which can create problems when changes to the structures of the tables need to occur, or when data is being loaded. In one approach, the DIAP creates a layer between the applications and users and all references to the underlying physical tables. This allows the DIAP to duplicate content for distributed processing, load data into off-line "clones" to be made available instantaneously once the load is complete, revert instantly to prior "editions" of the data content, and safely allow non-technical users to perform advanced data management functionality.

DIAP

FIGS. 1A-1B show a datagraph diagram illustrating embodiments of a data flow for the DIAP. In FIGS. 1A-1B, dashed lines indicate data flow elements that may be more likely to be optional. In FIGS. 1A-1B a user 102 may send a file upload request 121 to an ingest server 106 to make data associated with the file upload request available for analytics in an analytics engine. For example, the user may use a client device (e.g., a desktop, a laptop, a tablet, a smartphone) to access a DIAP website, application (e.g., a mobile app), and/or the like to facilitate generating the file upload request. In one implementation, the file upload request may include data such as a request identifier, a data source name, a data source type, a data source location, data source parameters, and/or the like. For example, the client May provide the following example file upload request, substantially in the form of a (Secure) Hypertext Transfer Protocol ("HTTP(S)") POST message including extensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>JohnDaDoeDoeDoooe@gmail.com</account_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        //it should be noted that although several client details
        //sections are provided to show example variants of client
        //sources, further messages will include only on to save
        //space
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6, 1</client_product_type>
        <client_serial_number>DNXXX1X1XXXX</client_serial_number>
        <client_UDID>3XXXXXXXXXXXXXXXXXXXXXXXXD</client_UDID>
        <client_OS>1OS</client_OS>
        <client_OS_version>7.1.1</client_OS_version>
        <client_app_type>app with webkit</client_app_type>
        <app_installed_flag>true</app_installed_flag>
        <app_name>DIAP.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0. 123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6, 1</client_product_type>
        <client_serial_number>DNXXX1X1XXXX</client_serial_number>
        <client_UDID>3XXXXXXXXXXXXXXXXXXXXXXXXD</client_UDID>
        <client_OS>1OS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
```

```
        <client_IP>10.0.0.123</client_IP>
        <user_agent_string>Mozilla/5.0 (Linux; U; Android 4.0.4; en-us; Nexus
S Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <file_upload_request>
        <request_identifier>ID_request_1</request_identifier>
        <data_source>
            <data_source_name>Search Engine Campaign 1</data_source_name>
            <data_source_type>File</data_source_type>
            <data_source_location>C: \DataLocation\DataFile.txt</data_source_location>
        </data_source>
        <data_source>
            <data_source_name>Search Engine Campaign 2</data_source_name>
            <data_source_type>SQL</data_source_type>
            <data_source_location>Database_123456</data_source_location>
            <data_source_parameters>SELECT * FROM
DataTable</data_source_parameters>
        </data_source>
    </file_upload_request>
</auth_request>
```

In some alternative embodiments, data may be made available for analytics in the analytics engine by having the ingest server 106 pull the data from an external data server 104. The ingest server may be configured to send an external data request 125 (e.g., periodically) to the external data server (e.g., to download data files from the external data server using FTP, to download data from the external data server using REST). The external data server may provide the requested data by sending an external data response 129.

Data provided via the file upload request and/or via the external data response May be used by a data ingest (DI) component 133 to generate a clean version of the data and/or to generate a metadata data set for the data. See FIG. 2 for additional details regarding the DI component.

The ingest server may send a clean data load request 137 to a data warehouse 110. In one embodiment, the clean data load request may specify a clean data file to upload to the data warehouse and generated DDL and/or bulk load commands to load data in the clean data file into a database table. See FIG. 7 for additional details regarding the clean data load request. The data warehouse may send a clean data load response 141 to the ingest server to confirm that data was loaded successfully.

The ingest server may send a metadata update request 145 to an analytics engine server 108. In one embodiment, the metadata update request may specify metadata for the loaded data to facilitate use of the loaded data in the analytics engine. See FIG. 16 for additional details regarding the metadata update request. The analytics engine server May send a metadata update response 149 to the ingest server to confirm that the metadata was loaded successfully.

The user may send an analytics request 153 to the analytics engine server to conduct analytics on the loaded data. In one implementation, the analytics request may include data such as a request identifier, a visualization type, input columns, filter settings, output settings, and/or the like. For example, the user's client may provide the following example analytics request, substantially in the form of a HTTP(S) POST message including XML-formatted data, as provided below:

```
POST /analytics_request.php HTTP/1.1
Host: www.server. com
Content-Type: Application/XML
Content-Length: 667
<?XML version = "1.0" encoding = "UTF-8"?>
<analytics_request>
```

```
<request_identifier>ID_request_3</request_identifier>
<visualization_module>
<visualization_module_identifier>ID_VM_1</visualization_module_identifier>
    <visualization>
        <visualization_type>TYPE_LINE_CHART</visualization_type>
        <inputs_count>3</inputs_count>
        <input>
            <column_name>column_line_1</column_name>
            <filter>date range filter</filter>
            <line_color>red</line_color>
        </input>
        <input>
            <column_name>column_line_2</column_name>
            <filter>date range filter</filter>
            <line_color>blue</line_color>
        </input>
        <input>
            <column_name>column_line_3</column_name>
            <filter>date range filter</filter>
            <line_color>yellow</line_color>
        </input>
        <output_line_chart_size>SIZE_LARGE</output_line_chart_size>
    </visualization>
    <visualization>
        ...
    </visualization>
    ...
</visualization_module>
</analytics_request>
```

The analytics request may be processed by an analytics engine (AE) component 157 to generate a visualization output requested by the user. See FIG. 3 for additional details regarding the AE component.

The analytics engine server may send a visualization module data request 161 to the data warehouse to retrieve data utilized by the AE component to generate the visualization output requested by the user. In one implementation, the visualization module data request may include one or more SQL statements (e.g., generated using the loaded metadata). The data warehouse may send a visualization data response 165 to the analytics engine server to provide the requested data.

The analytics engine server may send a visualization module output 169 to the user's client. The visualization module output may be used to generate the visualization output requested by the user. For example, the visualization output may be displayed using a DIAP website, application (e.g., a mobile app), and/or the like.

Figure 2:
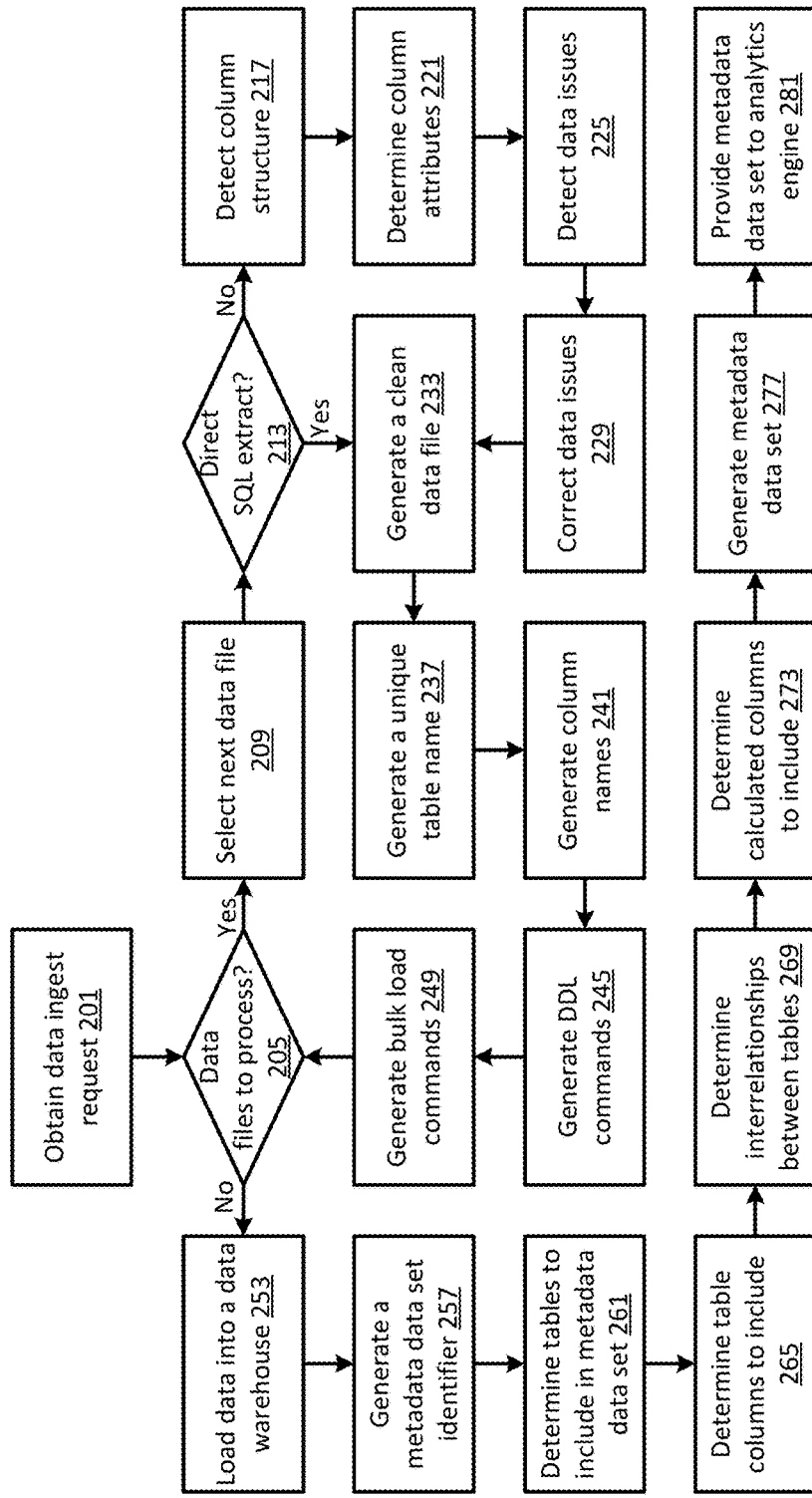
FIG. 2 shows a logic flow diagram illustrating embodiments of a data ingest (DI) component for the DIAP.

FIG. 2 shows a logic flow diagram illustrating embodiments of a data ingest (DI) component for the DIAP. In FIG. 2, a data ingest request may be obtained at 201. For example, the data ingest request may be obtained as a result of a user uploading a data file to make data associated with the data file available for analytics in an analytics engine. In one implementation, the user may utilize the analytics engine's GUI to facilitate the upload of the data file.

A determination may be made at 205 whether there remain data files to process. A user may specify (e.g., via a GUI, via a configuration setting) one or more data files to process and any specified data file may be processed. In various implementations, data files may include single flat files, multiple-file star schemas, multiple files to be appended together to form a single database table, unstructured JSON data from web-based APIs (e.g., Google, YouTube, Twitter, Tumblr), direct SQL extract of data, and/or the like. In one embodiment, the user may upload data files or identify data files to be obtained from an external server (e.g., retrieved from a web page, FTP server, Amazon S3 bucket, SQL server). In another embodiment, data files may be pulled by an ingest server. If there remain data files to process, the next data file to process may be selected at 209.

A determination may be made at 213 whether the selected data file is a direct SQL extract. If the selected data file is a direct SQL extract (e.g., from an external database), the data file is already properly formatted (e.g., has clean data). If the selected data file is not a direct SQL extract, the data file may be cleaned up. Column structure associated with the data file may be detected at 217. In one implementation, the number of columns and/or their names may be detected. In another implementation, blank columns may be removed to, reduce storage use and/or to ensure that stored columns contain valid data that can be used by the analytics engine. Column attributes may be determined at 221. In one implementation, the optimal most-specific data type for each column may be determined. For example, if a column's values are integers, then the column's data type may be set as INTEGER. In another implementation, maximum column width may be determined for each column. For example, if the longest value in a text column is 10 characters, the column's data type may be set as VARCHAR (10). Data issues may be detected at 225. For example, if a column's values are integers except for one value, the column may have a data error. Detected data issues may be corrected at 229. In one implementation, the user may be prompted to correct the detected data error (e.g., provide a correct value via a GUI). In another implementation, data errors may be corrected automatically (e.g., set to a default value such as 0 for integers). For example, if the user believes that a text-based column should be a date or number, the code below may be used to evaluate each value and returns a I/O to indicate whether the individual value can be coerced into the desired data type or not. This is then rendered into a preview table that the user can review in the browser, with the incompatible values shaded red. The user can then clean up incompatible values.

```
i = 0
for c in aql ['columns']:
    c['index'] = i
    columns. append(c)
``` characters). For example, in the table below, source column names (e.g., specified in a header row of the data file), corresponding generated column names, and corresponding easy to read caption to be used in the analytics engine for each column are shown.

| Source (First Row) | Column Name in Redshift | Caption in Catalog |
|---|---|---|
| "BrandID_SK" | brand_id_sk | Brand Id Sk *ignored (ID col) |
| #ADVERTISER_HIERARCH_KEY | advertiser_hierachy_key | Advertiser Hierachy Key |
| ACCOUNT_GROUP_NAME | account_group_name | Account Group Name |
| ClientCode | client_code | Client Code |
| data_provider_name | data_provider_name | Data Provider Name |

-continued

```
        output.append (default_table ['alias'] + '.'' + c['name'] + '"')
        if c['name'] == 'explorer_import_id':
            isExistAppendColumns = True
        if 'simpleTypeChange' in c:
            # supported:
            # metric to attr-number (dataset)
            # attr-number to metric (dataset)
            # attr-text to date or number or metric
            if c['simpleType'] == 'attr-text':
                # the approach we're using is to add an additional 0/1 column for
each column to be tested
                # this value should be 0 if the value PASSES the conversion, and 1
if it does NOT pass.
                # in the javascript, we attach the index of this 'test-indicator'
column to the column
                # object for the original column, and then reference that to
display indicators for the individual
                # cells where the test did not pass.
                if c['simpleTypeChange'] in ['attr-date', 'metric', 'attr-number']:
                    if c['simpleTypeChange'] in ['metric', 'attr-number'] :
                        colSql = 'case when "{0}" ' + "similar to '[0-9]*, ? [0-
9]*, ? [0-9]*, ? [0-9]*, ? [0-9] *. ? [0-9]*' then 0 else 1 end"
                    if c['simpleTypeChange'] == 'attr-date':
                        colSql = """
                            case when "{0}" similar to '[0-9]{{2, 4}}-[0-9]{{2}}-[0-
9]{{2}}' then 0
                                when replace("{0}", ' 0:00' , '') similar to ' [0-
9]{{0,2}}/[0-9]{{0, 2}}/[0-9] {{2, 4} }' then 0
                                else 1 end
                        """
                    i += 1
                    columns.append({'name':'adeti_' + c['name'], 'index': i})
                    output.append ( ( colSql + ' as "adeti_{0}"').format (c ['name'] )
)
        i += 1
```

A clean data file may be generated at 233. In one implementation, the clean data file may be a text-delimited text file that includes the clean data. See FIG. 7 for an example of a data file and a corresponding clean data file.

A unique table name may be generated for the data file at 237. In one embodiment, a table with the unique table name may be used for the selected data file. In another embodiment, a table with the unique table name may be used for a set of data files (e.g., multiple files to be appended together to form a single database table) including the selected data file. In one implementation, a table name may be determined for the data file (e.g., based on the filename of the data file, based on a parameter associated with the data file) and a timestamp (e.g., ingestion timestamp) may be appended to the determined table name to generate the unique table name.

Column names for the columns in the clean data file may be generated at 241. In one implementation, column names may be generated by normalizing common conventions (e.g., make words lowercase, separate words by an underscore, convert spaces to underscores, and remove special characters). For example, in the table below, source column names (e.g., specified in a header row of the data file), corresponding generated column names, and corresponding easy to read caption to be used in the analytics engine for each column are shown.

DDL commands utilized to create a database table to hold data from the clean data file may be generated at 245. For example, a CREATE TABLE command that specifies the generated unique table name and the generated column names may be generated. Bulk load commands utilized to load the data from the clean data file into the database table may be generated at 249. For example, a COPY command that specifies the clean data file and the database table may be generated. See FIG. 7 for an example of generated DDL and bulk load commands.

If there are no more data files to process, data specified in the data ingest request May be loaded into a data warehouse at 253. In one implementation, a clean data load request may be utilized to load the data. For example, the clean data file may be uploaded to a storage location (e.g., Amazon S3 bucket), and the DDL and bulk load commands may be executed at a data warehouse (e.g., Amazon Redshift) to create a database table and load data from the clean data file into the database table, respectively.

A metadata data set identifier may be generated at 257 for a metadata data set associated with the loaded data. For example, a unique identifier may be generated. Tables to include in the metadata data set may be determined at 261. In one implementation, the database table with the loaded data may be included. In another implementation, other database tables that the user wishes to analyze along with the table with the loaded data May be included (e.g., specified by the user via a GUI). Table columns to include in the metadata data set may be determined at 265. In one implementation, any column in an included database table may be included. In another implementation, the user may specify which columns should be included (e.g., via a GUI). In some implementations, naming conflicts between columns from different tables may be automatically fixed (e.g., by prompting the user to specify names for conflicting columns via a GUI, by appending a number to conflicting column names). Interrelationships between tables may be determined at 269. In one implementation, if there are multiple included database tables, the user may be prompted to specify how the database tables should be joined (e.g., by specifying names of columns on which to join via a GUI, by providing a custom SQL JOIN statement). In another implementation, how the database tables should be joined may be determined automatically (e.g., based on column names). Calculated columns to include may be determined at 273. In one implementation, the user may be prompted to specify parameters to use for a calculated column. For example, the user may wish to create a calculated column Rowcount that uses the SQL COUNT function to calculate the number of rows that match specified criteria (e.g., the number of rows for each analyzed date).

The metadata data set may be generated at 277. In one embodiment, the metadata data set may be a file (e.g., a JSON file) that includes information that allows the user to interact with the loaded data using the analytics engine. The metadata data set may include a list of available columns and/or properties that determine how each column is represented in the GUI of the analytics engine and what the user is allowed to do with the column. In one implementation, information about each column may include a readable caption, a data type (e.g., INTEGER, VARCHAR (10)), an expression (e.g., defining how to access the column using SQL), statistics (e.g., min/max values, the number of distinct values, the list of values (e.g., for columns with fewer than 40 distinct values)), a classification (e.g., Metric if the column is numeric, Attribute if the column is not numeric), read/write access permissions, and/or the like. The metadata data set may also include information about included database tables and/or how to join them. The metadata data set may provide a flexible layer between how data elements are presented to the user, and how they are actually stored in a database. The user does not have to see real table names or real column names. Captions representing columns may be provided in a single list or using custom folders that may or may not reflect which tables the columns are in. Further, the metadata data set May allow the DIAP to disconnect physical database activities, such as loading new data, from the user experience. For example, for a specific source, a new data update may be loaded into a new set of database tables, and when the update is complete, the metadata data set may be updated to point to the new tables, resulting in zero down time for the user. See FIG. 16 for an example of a metadata data set.

The generated metadata data set may be provided to the analytics engine at 281. In one implementation, a metadata update request may be utilized to provide the metadata data set to the analytics engine.

Figure 3:
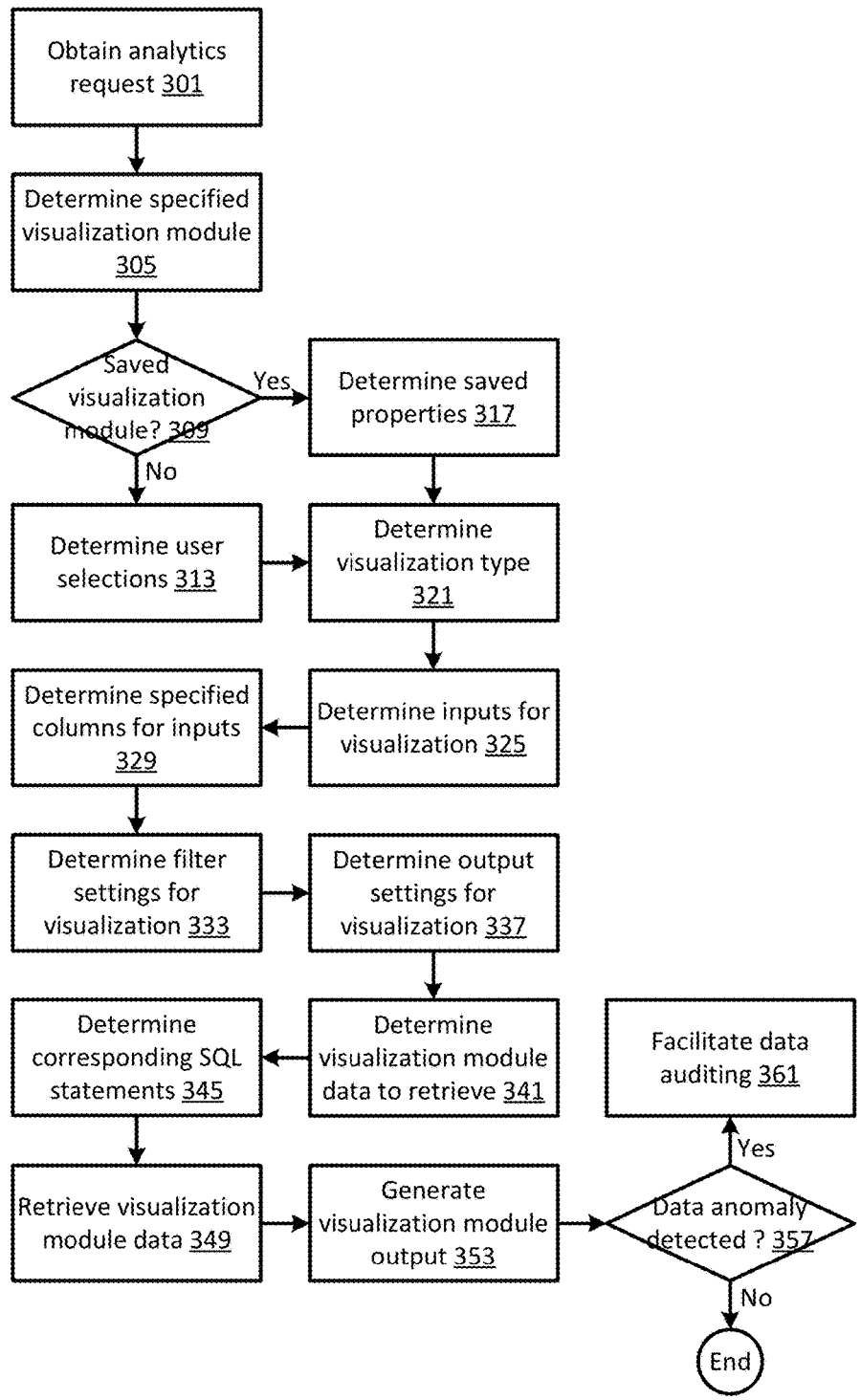
FIG. 3 shows a logic flow diagram illustrating embodiments of an analytics engine (AE) component for the DIAP.

FIG. 3 shows a logic flow diagram illustrating embodiments of an analytics engine (AE) component for the DIAP. In FIG. 3, an analytics request may be obtained at 301. For example, the analytics request may be obtained as a result of a user utilizing an analytics engine to generate a visualization module output.

The specified visualization module may be determined at 305. In one implementation, this determination may be made by parsing (e.g., via PHP) the analytics request to determine a visualization module identifier. In one embodiment, a visualization module may include a collection of properties that facilitate generating one or more visualizations (e.g., tables, charts) and associated queries. In some implementations, the visualization module may be saved and reloaded.

A determination may be made at 309 whether the specified visualization module is a saved visualization module. If the visualization module is not a saved visualization module, the user's selections (e.g., made via a GUI of the analytics engine) may be determined at 313. For example, this determination may be made by parsing (e.g., via PHP) the analytics request to determine properties associated with the visualization module. If the visualization module is a saved visualization module, saved properties associated with the visualization module may be determined at 317. For example, the saved properties may be retrieved from a DIAP database.

A visualization type of a visualization associated with the visualization module may be determined (e.g., for each visualization associated with the visualization module) at 321. For example, a visualization type may include a table, a pivot table, a line chart, a bar chart, an area chart, a stack chart, a percent stack chart, a geo chart, a horizontal bar chart, a bubble chart, a pie chart, and/or the like. In one implementation, this determination may be made based on the determined properties of the visualization module.

Inputs associated with the visualization may be determined at 325. In one implementation, this determination may be made based on the visualization type. For example, different visualizations may utilize different types and/or number of inputs (e.g., a line chart may use one or more inputs that are columns of numeric data). In another implementation, this determination may be made based on the determined properties (e.g., user selections) of the visualization module. For example, the user may select how many inputs should be associated with a line chart (e.g., 3 inputs for a line chart with 3 lines).

Columns specified for inputs may be determined at 329. For example, the user May select (e.g., via a GUI) a column that should correspond to each input associated with the visualization. In one implementation, this determination may be made based on the determined properties of the visualization module.

Filter settings for the visualization may be determined at 333. For example, data May be filtered based on any number of criteria (e.g., data in a column may be filtered based on date). In one implementation, this determination may be made based on the determined properties of the visualization module.

Output settings for the visualization may be determined at 337. For example, output settings may include the visualization's size settings (e.g., small, large, specific dimensions), color settings (e.g., font color, line color), labels, and/or the like. In one implementation, this determination may be made based on the determined properties of the visualization module.

Visualization module data to retrieve may be determined at 341. In one implementation, this determination may be made based on a combination of columns and associated filters specified for inputs for each visualization associated with the visualization module (e.g., if multiple visualizations are associated with the visualization module, 321 through 337 may be repeated for each visualization, and data utilized by these visualizations may be determined). For example, for each input, the name of the column and filter values, if any, may be determined.

Corresponding SQL statements utilized to retrieve the determined visualization module data may be determined at 345. For example, for each input, a SQL statement to retrieve the corresponding data may be generated. In one implementation, the corresponding SQL statements may be generated based on the metadata data set utilized by the user for the visualization module (e.g., by mapping metadata data set columns to real database tables and columns). For example, if the user selected a column with caption "Status" for an input of a visualization, and the metadata data set is associated with the table shown in FIG. 7, the corresponding SQL statement may be:

SELECT status FROM adet_20140220_104234_demo1_dim_search_campaign

If the user specified a filter, corresponding parameters may be specified in the above SQL statement using a WHEREIN clause (e.g., to specify a date range).

The determined visualization module data may be retrieved at 349. In one implementation, a visualization module data request may be utilized to request the determined visualization module data, which may be returned via a visualization module data response. For example, the generated corresponding SQL statements may be executed at a data warehouse (e.g., Amazon Redshift) to retrieve the desired data.

Visualization module output may be generated at 353. In one implementation, each visualization associated with the visualization module may be generated for the user using the retrieved visualization module data. For example, the visualization module output May be sent to the user's client.

A determination may be made at 357 whether a data anomaly has been detected. In one implementation, a data anomaly may be detected based on input from the user (e.g., the user may identify an anomalous data point in a table or a chart). In another implementation, a data anomaly may be detected by the DIAP based on data analysis (e.g., a data point May be outside of an expected range). If a data anomaly has been detected, the DIAP May facilitate data auditing at 361. In one implementation, the DIAP may detect how anomalous data entered the system. For example, different database table versions may be analyzed (e.g., compared to determine the version in which the anomalous data first appeared) and audit trail data such as the source (e.g., name of an uploaded file, name of vendor of unstructured JSON data) of the anomalous data, the date and/or time at which the anomalous data entered the system, who (e.g., name of a person, identifier of an automated process) entered the anomalous data into the system, and/or the like may be determined. In another implementation, the DIAP may provide a notification that a data anomaly has been detected. For example, the DIAP may send an alert (e.g., an email, an SMS message, an application notification) with audit trail data to an administrative user. In another example, the analytics engine may notify the user (e.g., a chart may be used to visualize outliers for a specific attribute or metric). The chart may be used to detect outliers with more than a specified number of standard deviations (e.g., the number of standard deviations may be controllable by the user by adjusting a configuration setting via a GUI (e.g., a slider) of the analytics engine). Example pseudo code to detect outliers is illustrated below:

NumberOfStandardDeviations=getSliderSetting( );
for each dataPoint {
    if    (stdDev(data)*NumberOfStandardDeviations<
       getDataPointStdDev(dataPoint)) highlightDataPoint
       (dataPoint),)
}

Figure 11:
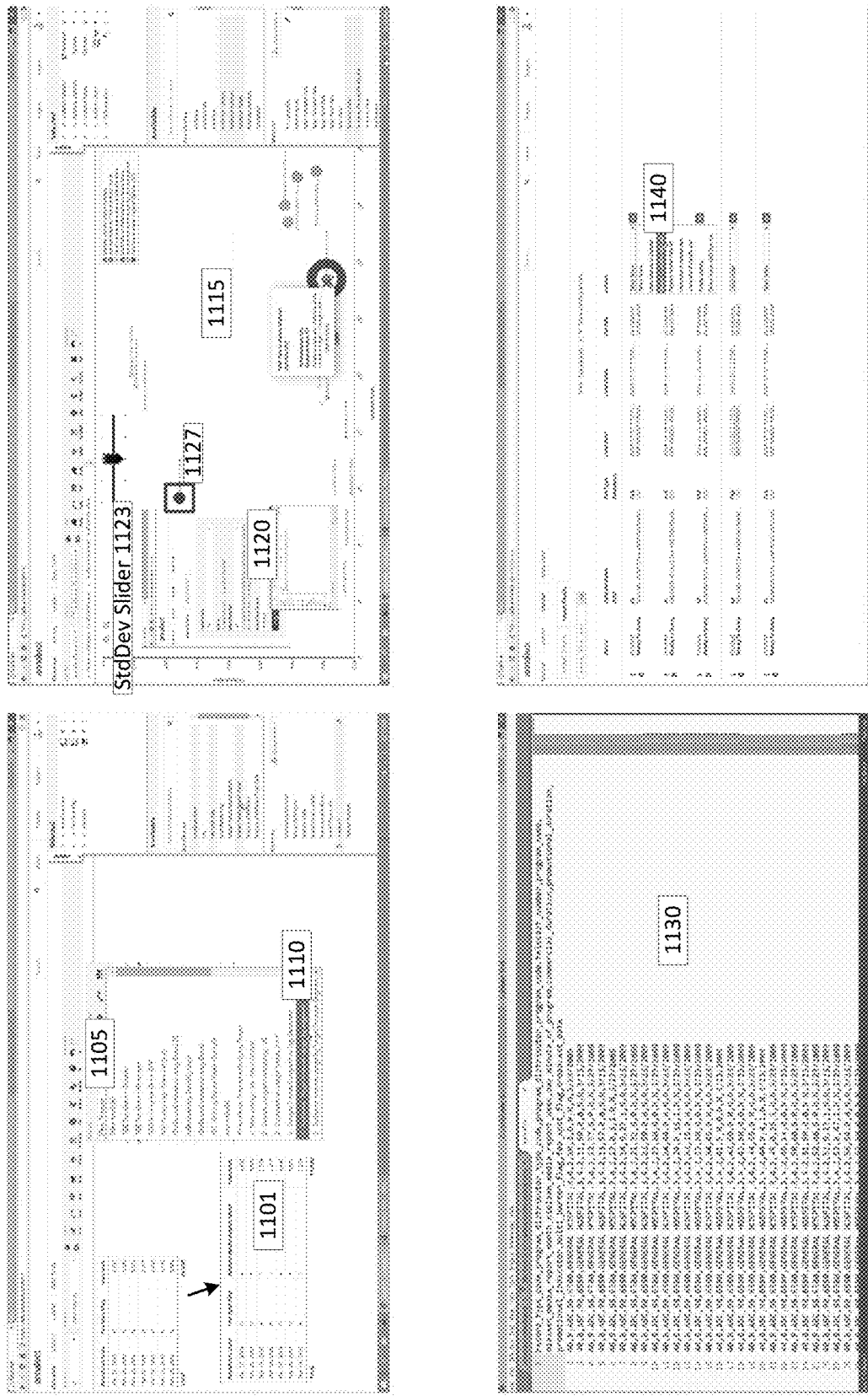

See FIG. 11, for illustrations of a slider 1123 to control the number of standard deviations and of a highlighted outlier data point 1127. In one embodiment, the above deviation detection code may be incorporated into the ingest component (e.g., code) discussed at 229 of FIG. 2. In addition, rather than being operable via the interface via FIG. 11, such deviation/anomaly detection may take place automatically during ingest. In another embodiment, such deviation/anomaly detection may take place ad hoc, periodically (e.g., every second, minute, hour, day, week, bi-weekly, monthly, bi-monthly, annually, bi-annually, on demand, etc.) as set via cron job.

Figure 4:
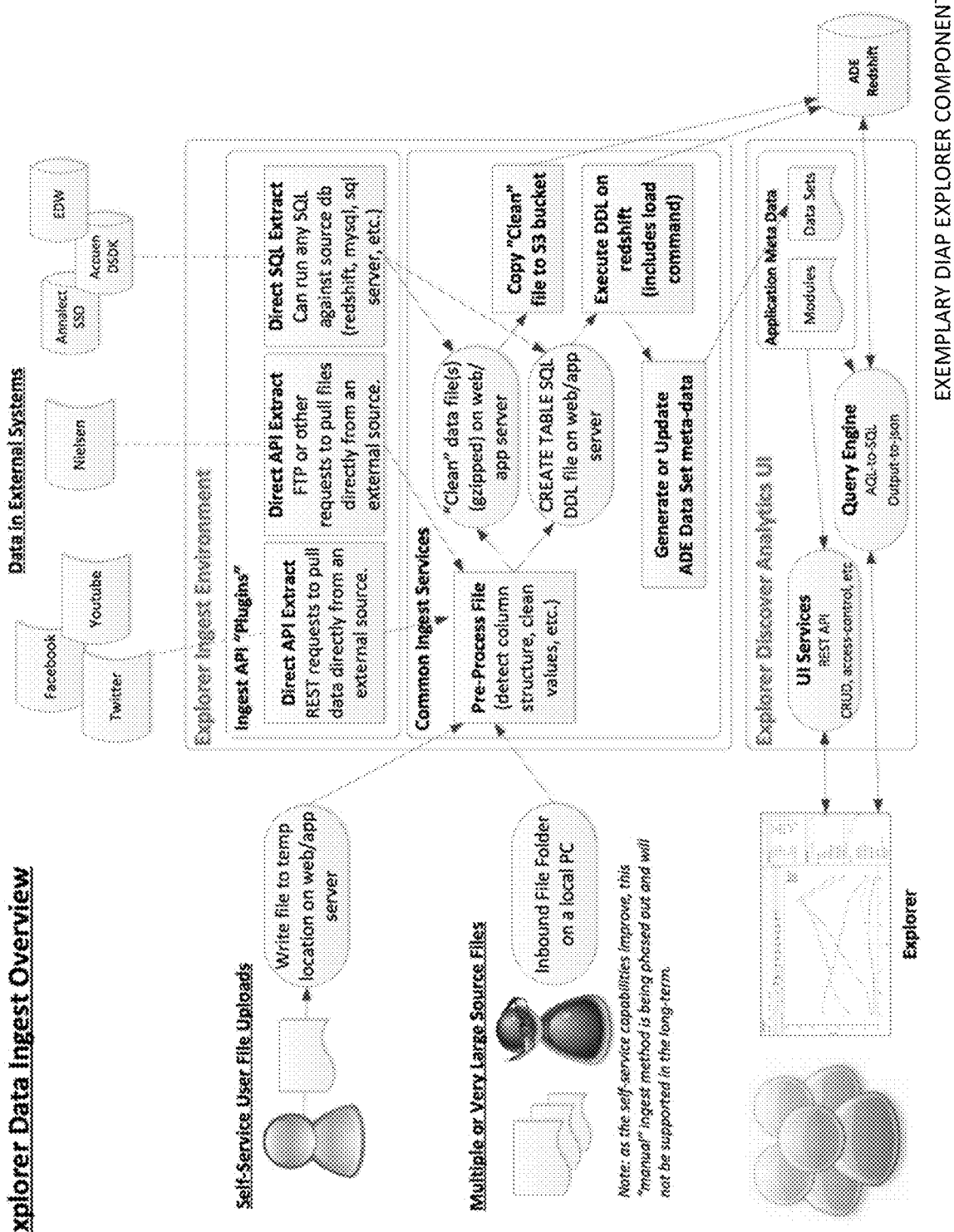
FIG. 4 shows a datagraph diagram illustrating exemplary data ingest embodiments for the DIAP.

FIG. 4 shows a datagraph diagram illustrating exemplary data ingest embodiments for the DIAP. In FIG. 4, data may be provided for ingestion by a user (e.g., a user may upload files to a server, a user may specify a local folder from which files may be obtained), or by an ingest API plugin (e.g., a plugin may pull data using REST from an external source (e.g., Facebook, YouTube, Twitter), a plugin may pull files using FTP from an external source (e.g., Nielsen), a plugin may obtain data by running SQL against a database source (e.g., Annalect SSO, Accuen DSDK, EDW)).

A data file may be preprocessed (e.g., to detect column structure, to clean up the data), and the clean data file may be utilized to generate DDL and/or load commands. The clean data file may be copied to an Amazon S3 bucket, and the generated DDL and/or load commands may be executed on Amazon Redshift to load the data in the clean data file into a data warehouse.

A metadata data set for the clean data may be generated and provided to an analytics engine (e.g., Explorer). The analytics engine UI services may utilize the metadata data set to generate the GUI of the analytics engine. For example, columns listed in the metadata data set may be shown in a list of columns in the GUI. Visualization modules created by users may also be utilized by the analytics engine UI services to retrieve saved visualizations. Visualizations may be generated using a Query Engine that translates analytics engine queries to SQL queries to retrieve data from the data warehouse.

Figure 5:
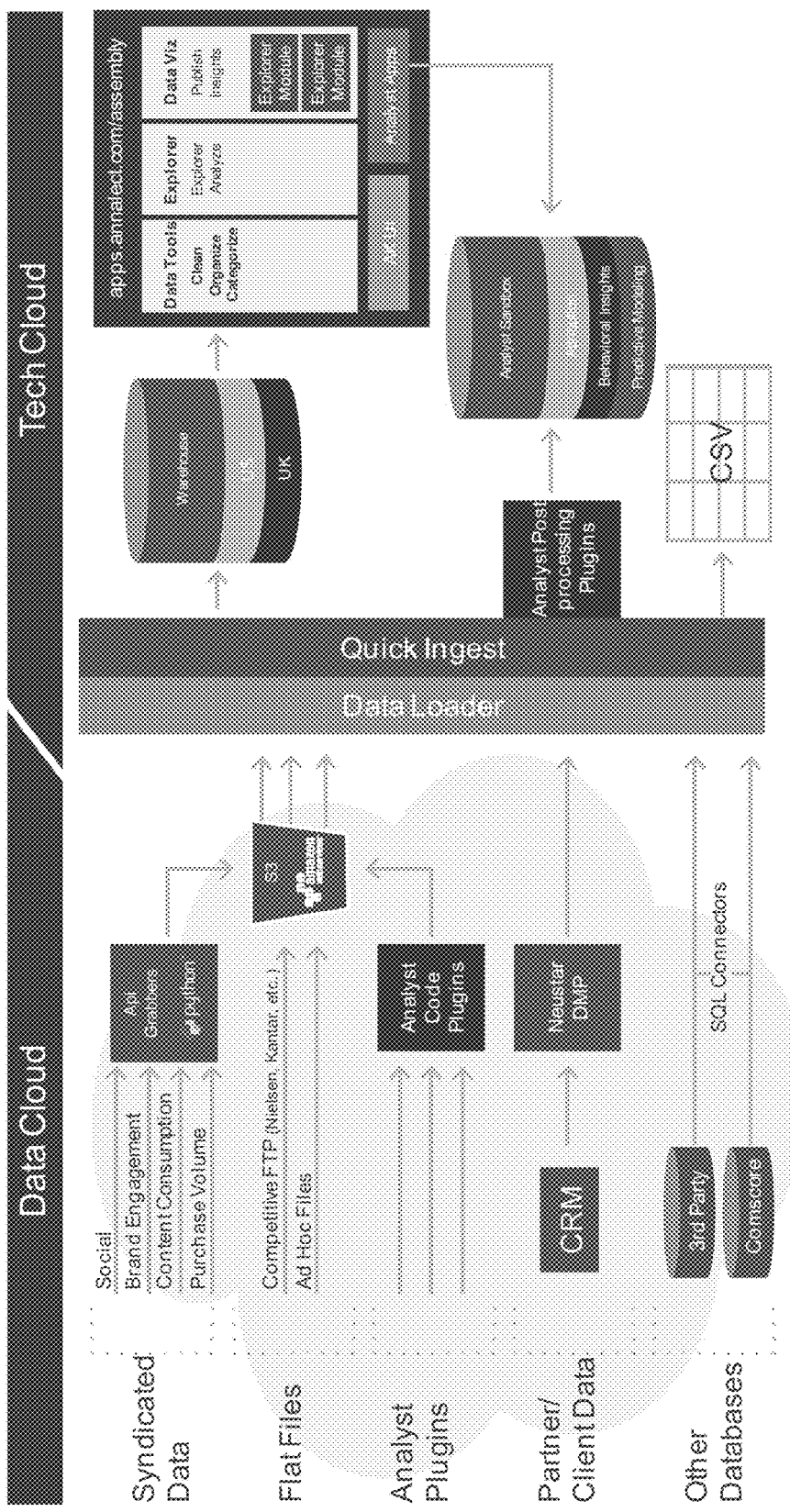
FIG. 5 shows a block diagram illustrating structural and data ingest embodiments for the DIAP.

FIG. 5 shows a block diagram illustrating structural and data ingest embodiments for the DIAP. In FIG. 5, various data sources of ingest data are shown. In various implementations, ingest data sources may include syndicated data, flat files, analyst plugins, partner or client data (e.g., from a customer relationship management (CRM) tool), other databases, and/or the like. Data may be ingested into a data warehouse (e.g., spread across multiple locations such as the US and the UK) and utilized by various applications (e.g., data tools, analytics tools, data visualization tools, analyst apps).

Figure 6:
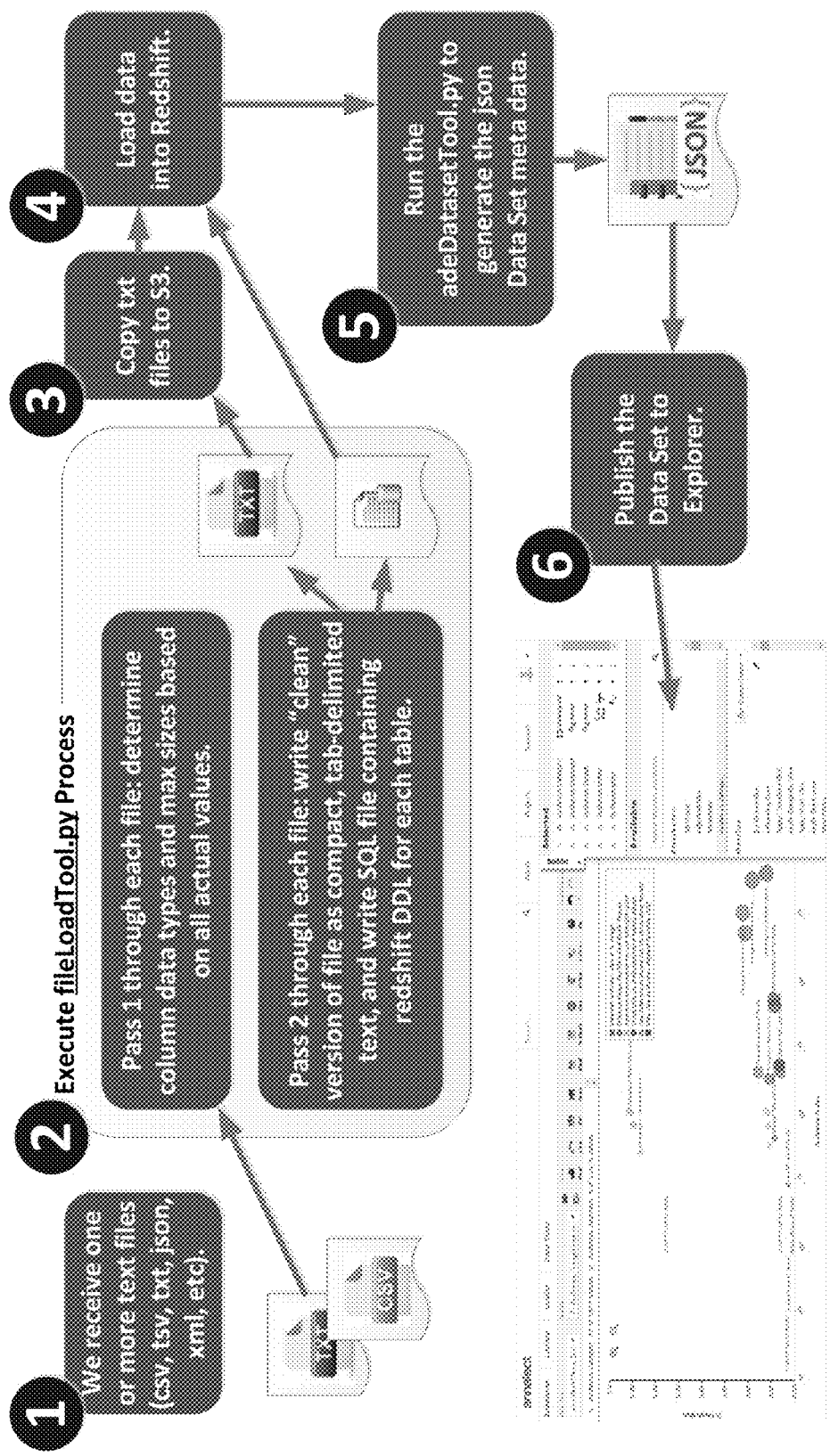
FIG. 6 shows a logic flow and use diagram illustrating data ingest and user interface embodiments for the DIAP.

FIG. 6 shows a logic flow and use diagram illustrating data ingest and user interface embodiments for the DIAP. In FIG. 6, ingest data may be received via one or more files (e.g., csv, tsv, txt, json, xml, and/or the like files). During the first pass through each file, column data types, maximum sizes for data values, and/or the like may be determined. During the second pass through each file, a clean version of the file may be generated (e.g., as a tab-delimited text file), and DDL and/or load commands for Amazon Redshift may be generated (e.g., as a SQL file). The clean data files may be copied to Amazon S3 and the data from these files may be loaded into Amazon Redshift (e.g., using the SQL file). A tool (e.g., written in Python) may be used to generate a metadata data set for the ingested data (e.g., a JSON file). The metadata data set maybe published to an analytics engine (e.g., explorer), at which point the ingested data (e.g., data columns) may become available in the list of available columns in the analytics engine. A user may utilize available columns in the analytics engine to generate visualizations, such as a bubble chart.

Figure 7:
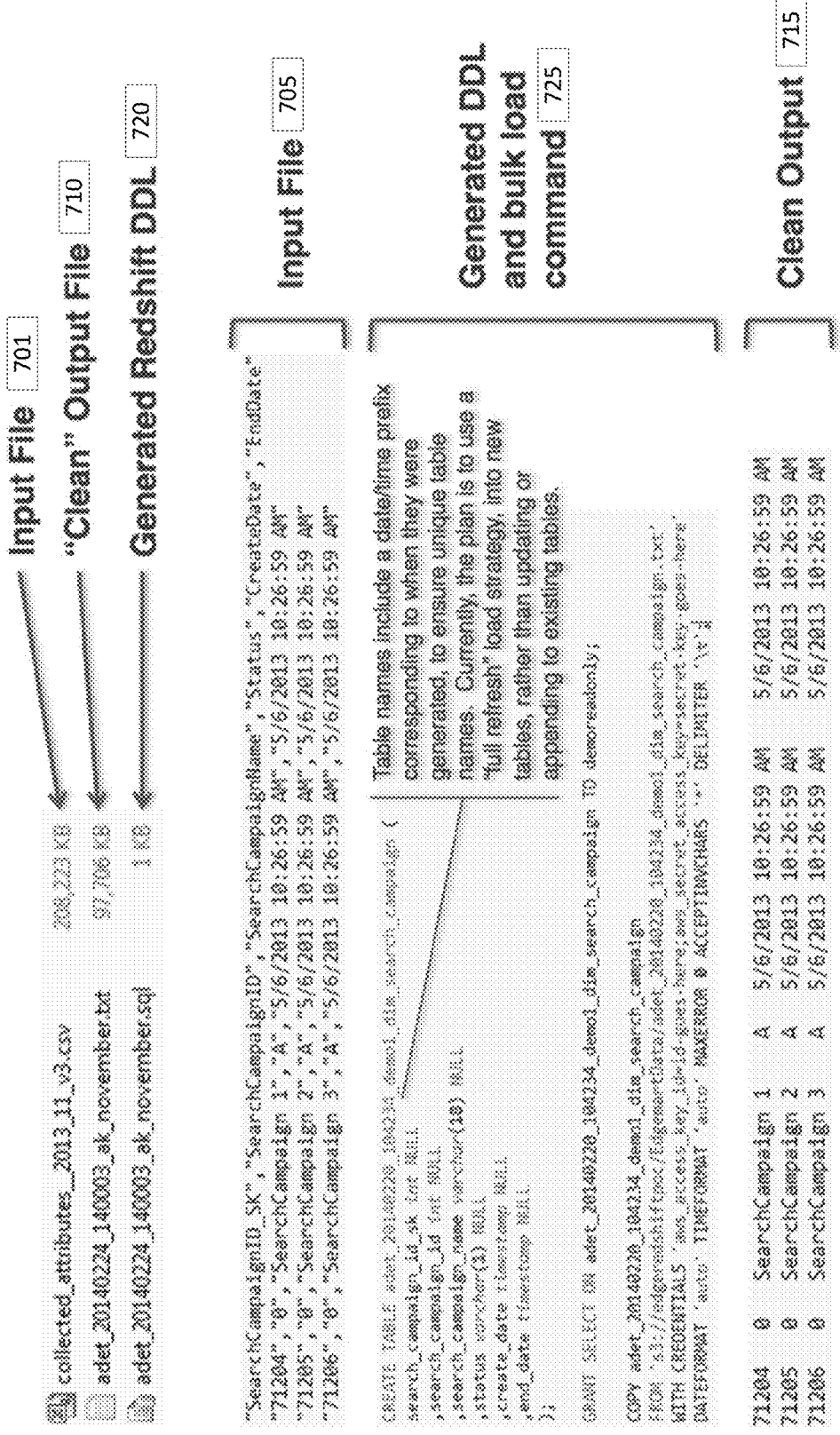
FIG. 7 shows a block diagram illustrating file output and datastructure embodiments for the DIAP.

FIG. 7 shows a block diagram illustrating file output and datastructure embodiments for the DIAP. In FIG. 7, ingest data is provided in a CSV input file 701. For example, the input file may be formatted as shown at 705. A clean TXT output file 710 May be generated with clean output. For example, the clean output file may be formatted as shown at 715. A SQL file with DDL (e.g., CREATE TABLE) and bulk load (e.g., COPY) commands 720 may be generated. For example, the SQL file may be formatted as shown at 725.

Figure 8:
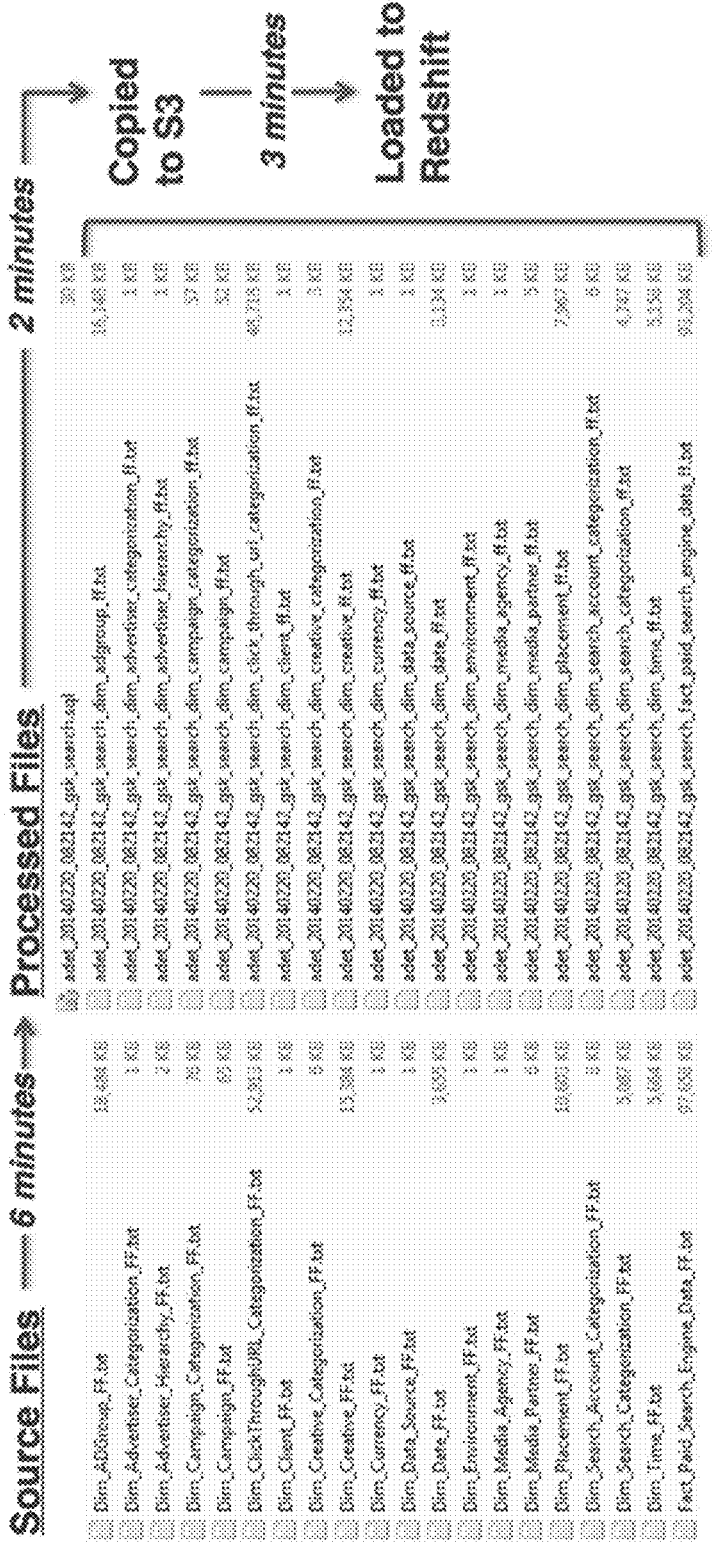
FIG. 8 shows a block diagram illustrating copy to server and load to redshift embodiments for the DIAP.

FIG. 8 shows a block diagram illustrating copy to server and load to redshift embodiments for the DIAP. In FIG. 8, an example star schema data (e.g., 204 MB) is provided via input files (e.g., source files). Clean output files (e.g., processed files) are, generated and copied to Amazon S3. The data in the clean output files is loaded into Amazon Redshift. Automatic loading of ingest data into Amazon Redshift may be configured to happen for any ingest job.

Figure 9:

FIGS. 9-16 show block diagrams illustrating screenshot user interfaces and datastructure embodiments for the DIAP. In FIG. 9, a user may log into an analytics engine (e.g., Explorer) at 901. The user may see a welcome screen shown at 905 upon login. The user may wish to import data into the analytics engine at 910. The user may select one of the options (e.g., File, FTP, Amazon S3, Facebook Ads API) for importing data at 915. The user may select to import data from a file and specify that the imported data should be added to an existing data set at 920. The user may select one of the existing data sets to which to add the imported data at 925. The user may select data set A1 to which to add the imported data at 930, and may select the file with the data to be imported at 935. The selected file may be uploaded at 940, which shows a progress indicator illustrating that the upload is 98% complete.

Figure 10:
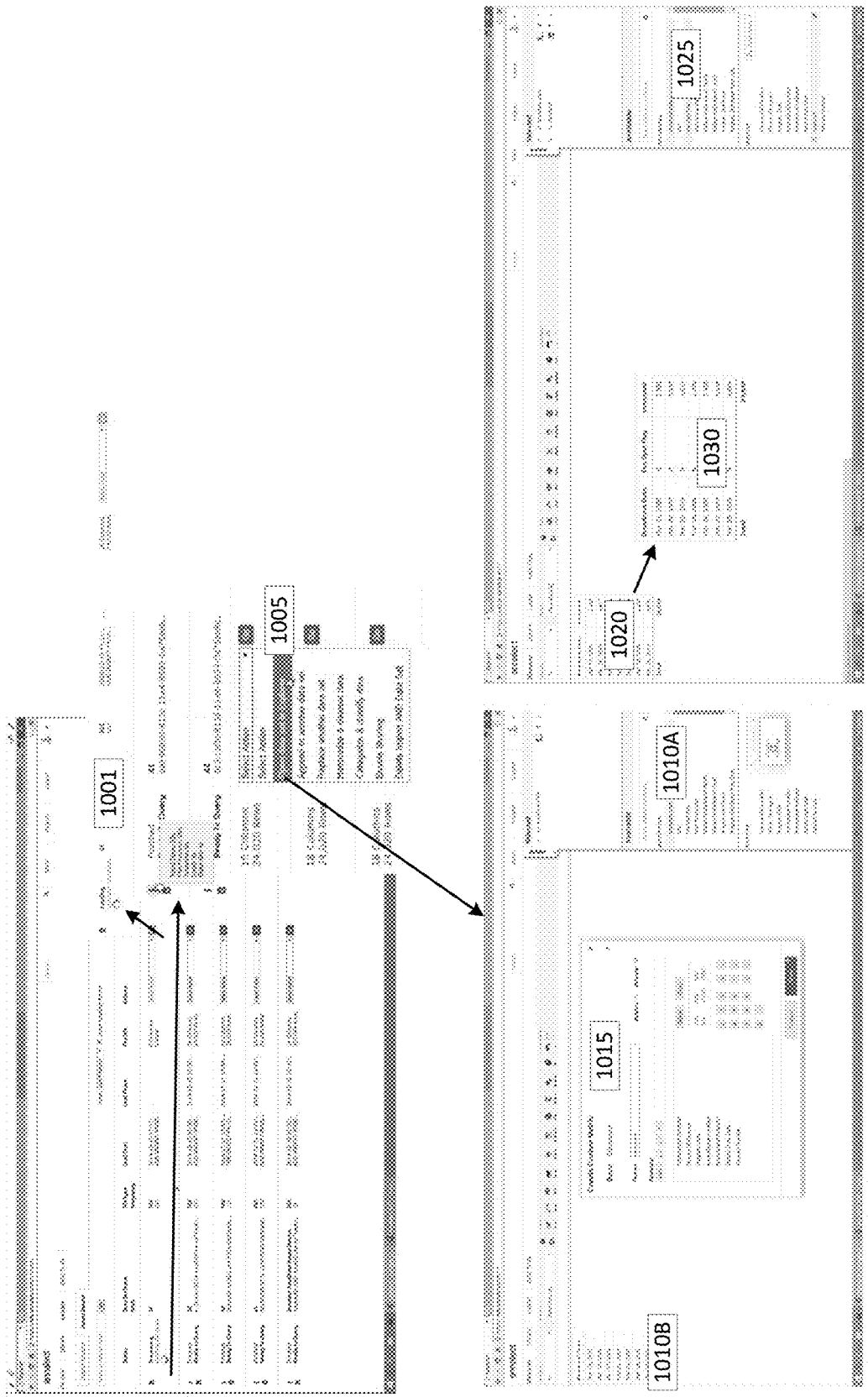

In FIG. 10, the file transfer may be completed at 1001, and the user may open the updated data set A1 in the analytics engine at 1005. The user may utilize columns specified in the data set to conduct analytics. In one implementation, columns may be separated into attributes and metrics. The user may select (e.g., using a mouse, using a touchscreen) an attribute column Broadcast Date 1010A and the corresponding column data may be shown at 1010B. The user may also create calculated columns (e.g., a custom metric rowcount) at 1015. A table 1020 shows the Broadcast Date column and the rowcount column. The user may select another column, such as Fee Spot Flag 1025, and the table may be updated to include the selected column at 1030.

In FIG. 11, the user may select another column, and the table may be updated to include the selected column as shown at 1101. The user may save the table in a visualization module (e.g., [New Module] or any other name specified by the user) at 1105. The user May also load a saved visualization module (e.g., Audience Target Internet usage by segment) at 1110. Visualizations associated with the saved visualization module are shown at 1115. The user may also wish to add additional data (e.g., data from additional sources, a new version of the data) to a data set A2 at 1120, in which case the user would go through a similar process to that shown in FIG. 9. An exemplary CSV input file that the user may upload is shown at 1130. The header row shows source column names and the other rows show data values. As shown at 1140, the user may wish to append data in data set A2 to another data set.

Figure 12:
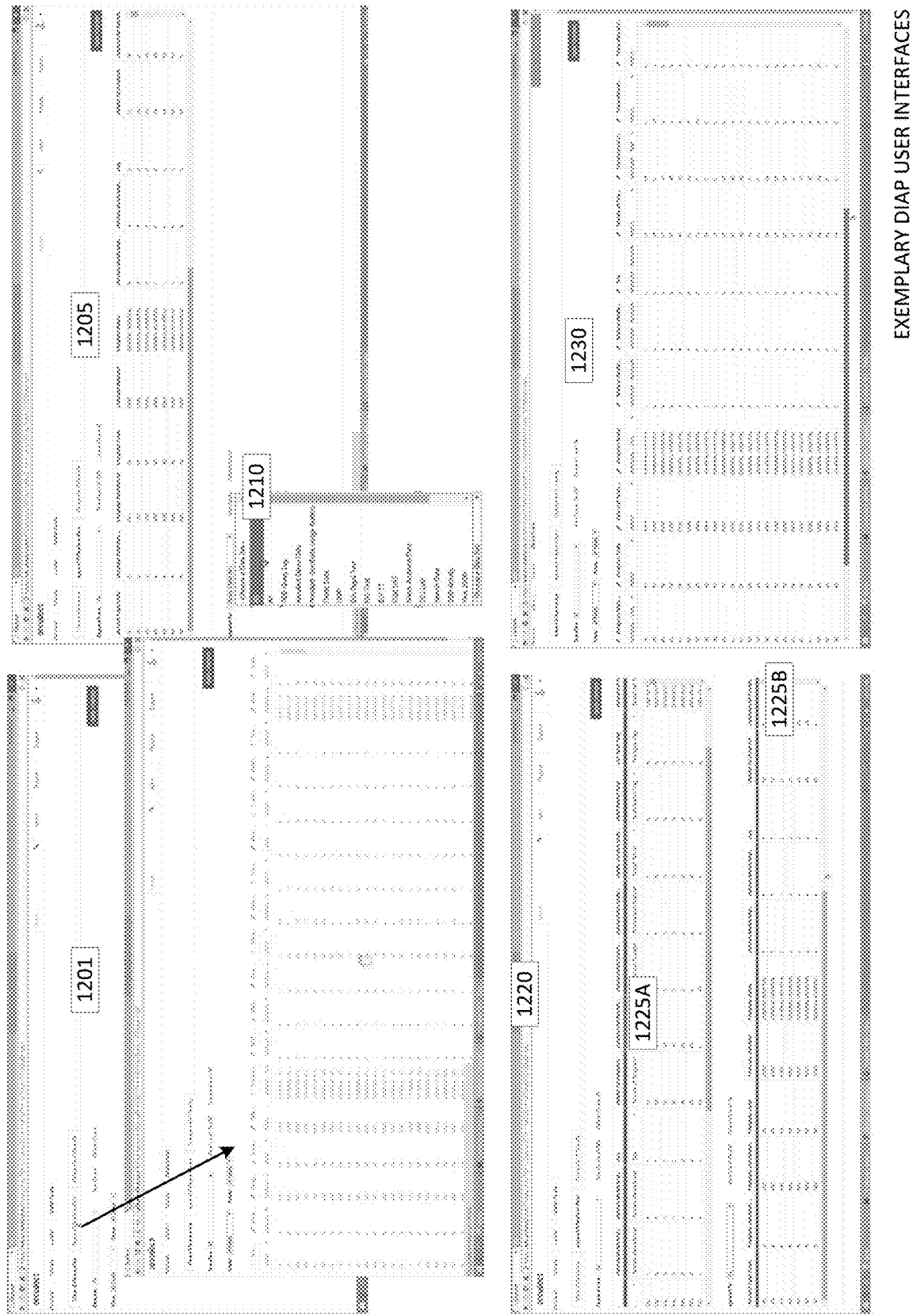

In FIG. 12, the user may be shown the Clean & Harmonize tab for data set A2 at 1201, and may switch to the Append & Replace Data tab. The user may be shown the Append & Replace Data tab at 1205, and may select the data set (e.g., data set A1) to which to append data set A2 at 1210. The two data sets are shown at 1220. Columns that do not match may be highlighted (e.g., with a red line). For example, Commercial Duration column in data set A2 1225A and in data set A1 1225B do not match. To deal with the mismatch, the user may use the Clean & Harmonize tab as shown at 1230.

Figure 13:
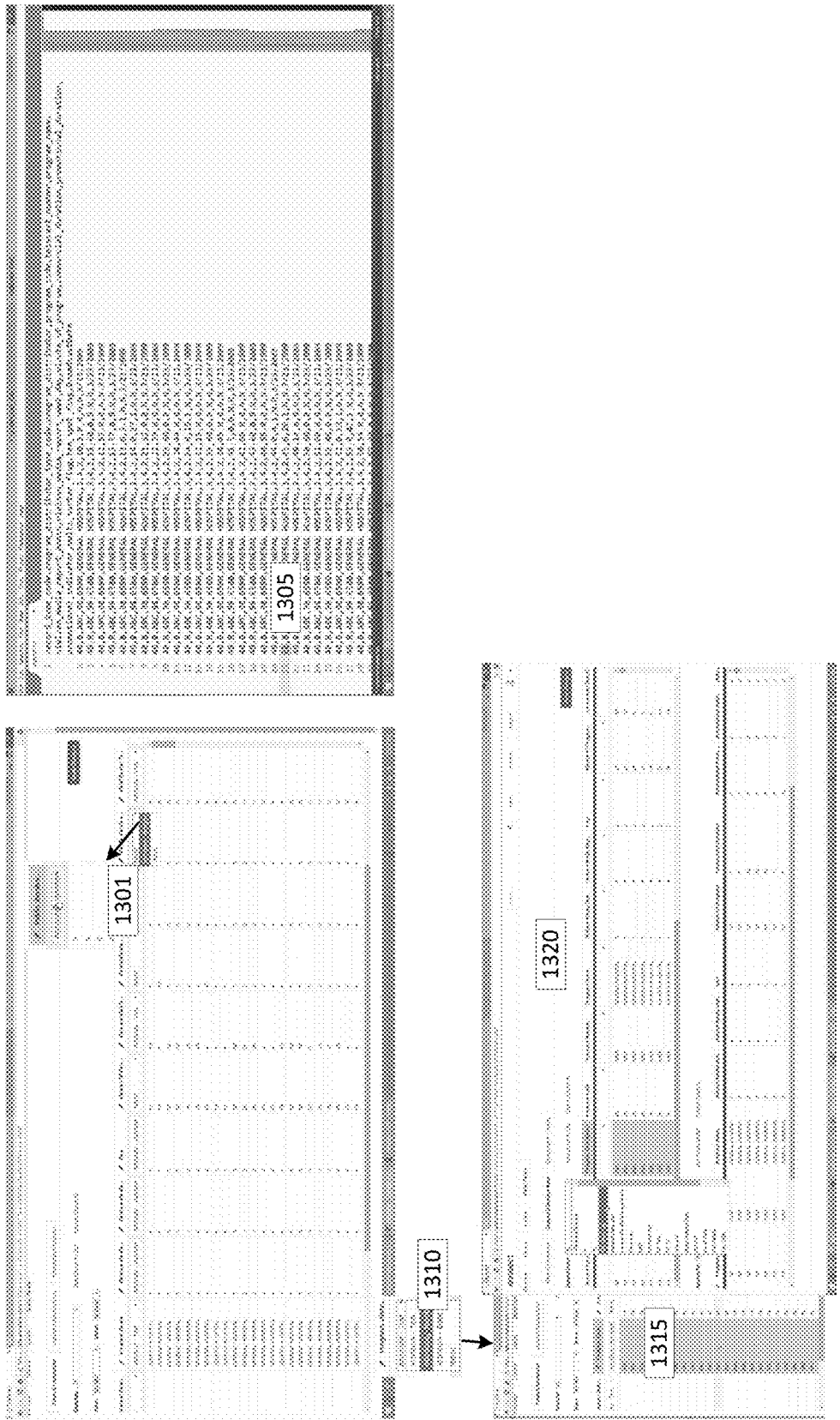

In FIG. 13, the user may use the Clean & Harmonize tab to fix the data type or classification associated with a column at 1301. For example, the user may change the classification of a column from Metric to Attribute—Number. In one implementation, this change may be saved in the metadata data set A2 without having to change the underlying database table column. If there is a mistake in the input file, as shown at 1305 where record_type_code in line 21 is EE instead of 40, the Clean & Harmonize tab may be used to fix the mistake. For example, the mistake may cause the classification of the column to be incorrect (e.g., Attribute—Text instead of Attribute—Number). Accordingly, at 1310, the user may change the classification to Attribute—Number. Any values that do not match the new classification (e.g., EE) may be highlighted at 1315, and the user may correct the value. Alternatively, the value may be corrected automatically (e.g., based on a default value, based on other values in the column). In some embodiments, the original values (e.g., for the corrected cell, for the classification) may be kept along with audit trail data regarding the change (e.g., as new columns in the database table). After making corrections, the user May go back to the Append & Replace Data tab.

In FIG. 14, the user may select different data sets in the Append & Replace Data tab at 1401. The user may wish to append one data set to another data set. Accordingly, the user may choose the data set from which to append data (e.g., data set A2) at 1405. The user may also choose a data set to which to append data (e.g., data set A1) at 1410. The two data sets are shown at 1415. Columns from data set A2 that can be matched to columns in data set A1 may be indicated by showing the name of the corresponding column, as illustrated at 1420 for column Day. If a column cannot be matched, a Select Action widget may be used by the user to indicate how to handle the column (e.g., append to a new column, do no append, select an existing column in data set A1 to which to append the column), as illustrated at 1425. In one embodiment, audit trail data associated with the append may be generated and/or stored in the data set A1. In one implementation, audit trail data May include an import identifier (e.g., to link back to the original ingest job GUID) column 1430, an import user name column 1435, and import date and time column 1440. In another implementation, audit trail data may include data (e.g., an identifier) that links a change to a specific row in a specific column.

Figure 15:
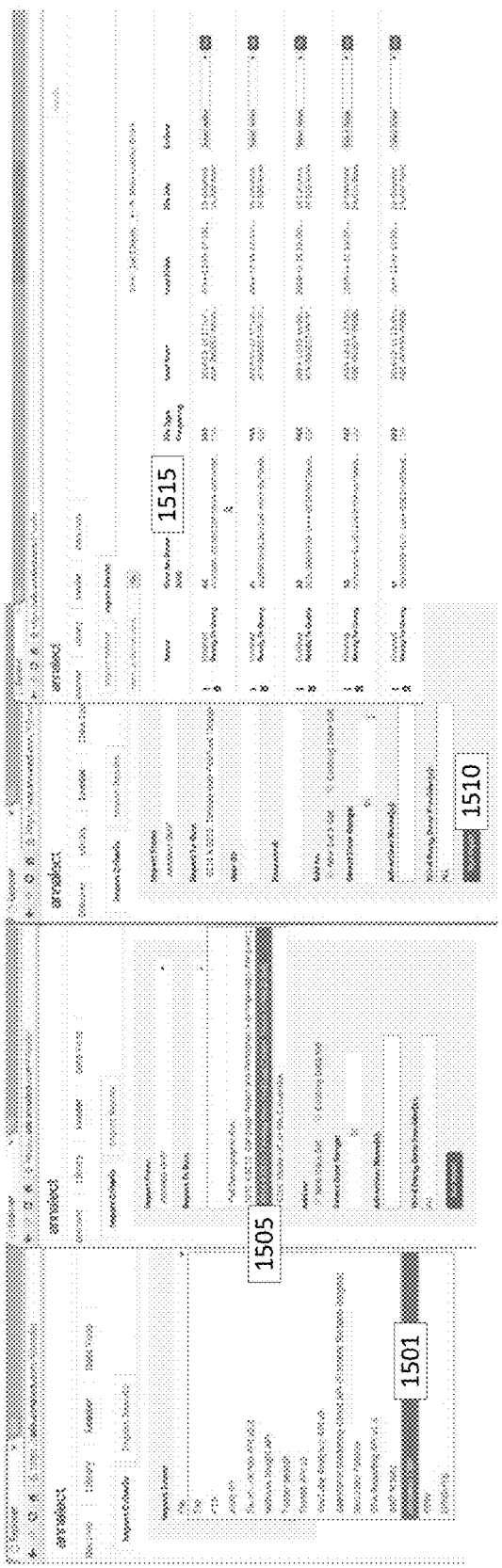

In FIG. 15, the user may wish to import data from Annalect data management platform (DMP) at 1501. Accordingly, the user may select a report to run at 1505. When the user selects various parameters (e.g., data range, advertiser name) and runs the ingest job at 1510, these parameters may be stored along with the ingest job globally unique identifier (GUID), which is shown for each ingest job in column 1515. Thus, the ingest job GUID may be used to link audit data to the parameters.

Figure 16:
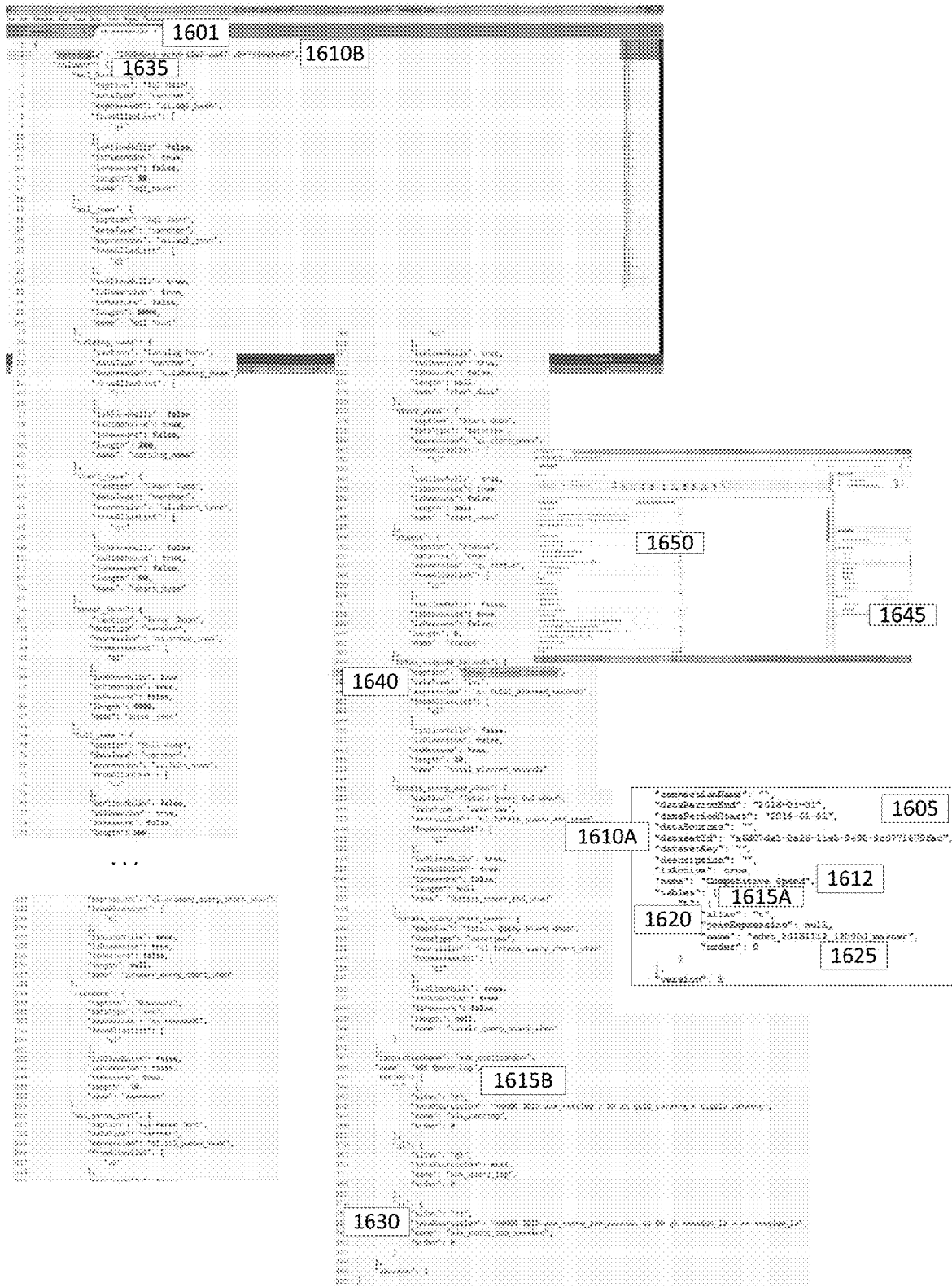

In FIG. 16, a JSON file with a metadata data set is shown at 1601 and some alternative embodiments for the metadata data set are shown at 1605. As illustrated at 1610A and 1610B, the metadata data set may have a dataset identifier (e.g., datasetId field). In one implementation, the dataset identifier corresponds to the GUID of the ingest job. The metadata data set may also have a name (e.g., Competitive Spend), as illustrated at 1612, that the user may see when interacting with the metadata data set in the GUI of an analytics engine (e.g., when the user selects a data set). The metadata data set may specify one or more database tables, as illustrated at 1615A and 1615B. A table may have an alias by which columns in the metadata data set may refer to the table. For example, at 1620, a table has an alias t. A table may include a name of the actual database table corresponding to the table. For example, at 1625, the table with alias t is linked to the database table with the name adet_20151112_120000_master. If there are multiple tables, a table may have a non-null joinExpression that may be used to perform a SQL JOIN with another table, as illustrated at 1630. The metadata data set may specify one or more columns, as illustrated at 1635. As illustrated at 1640, each column may have a plurality of properties. A column may have a property name that indicates the name of the column in a database table. A column may have a property expression that indicates how to access the column (e.g., q1.total_elapsed_seconds, where q1 is the alias of the database table with the column total_elapsed_seconds). For example, the property expression may be used to generate a SQL statement to retrieve column data. A column may have properties such as dataType (e.g., int), isDimension (e.g., false), and is Measure (e.g., true) that indicate the data type (e.g., integer) and classification (e.g., is not an attribute, is a metric) of the column. A column may have a property caption (e.g., Total Elapsed Seconds) that defines the name of the column that is shown to the user in the GUI of the analytics engine. Based on the column data, the column Total Elapsed Seconds is shown as a metric in the GUI of the analytics engine at 1645. The user may select this column, and the data associated with the column may be retrieved using the generated SQL statement and shown at 1650.

DIAP Controller

Figure 17:
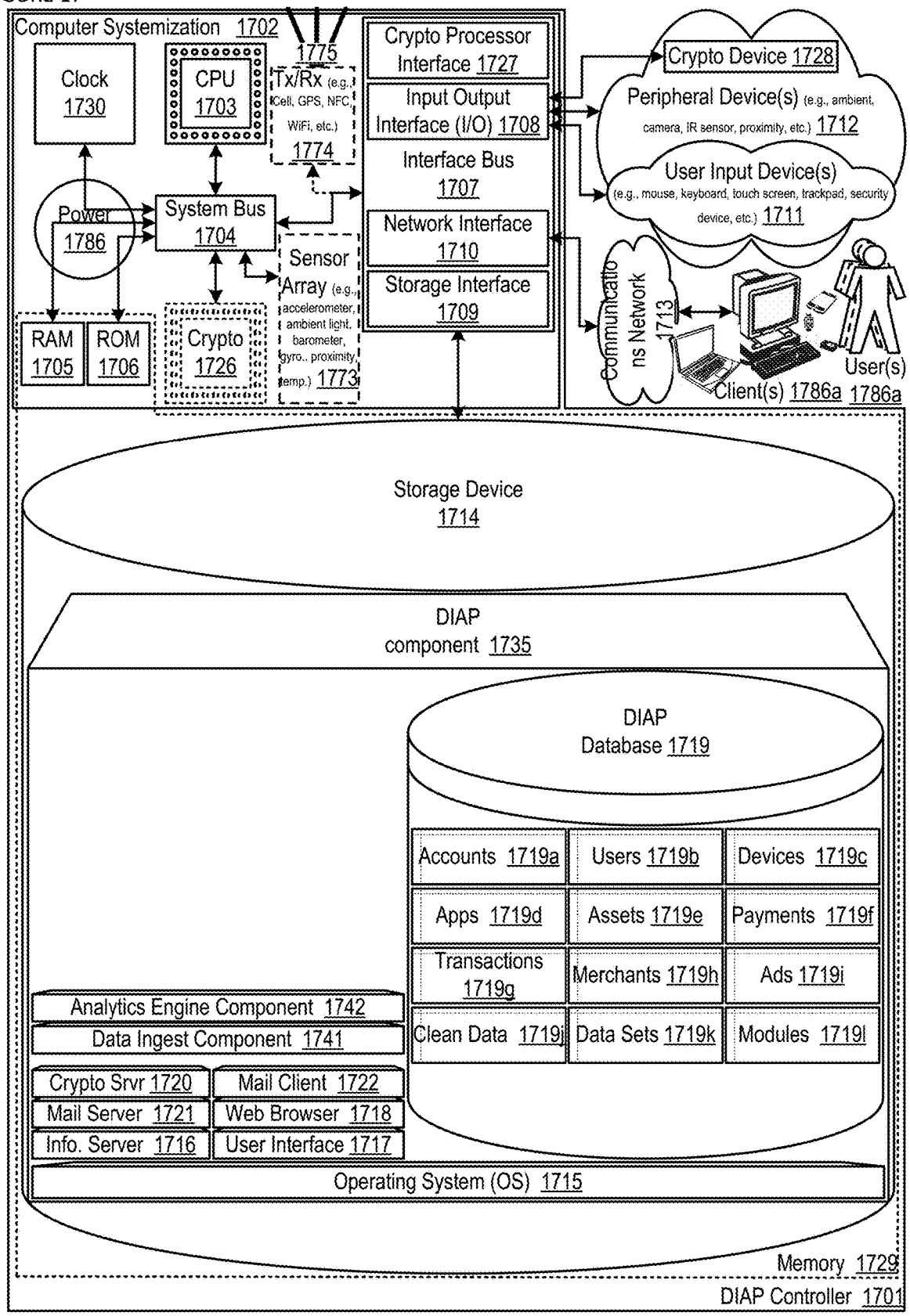
FIG. 17 shows a block diagram illustrating embodiments of a DIAP controller.

FIG. 17 shows a block diagram illustrating embodiments of a DIAP controller. In this embodiment, the DIAP controller 1701 may serve to aggregate, process, store, search, serve, identify, instruct, generate, match, and/or facilitate interactions with a computer through database technology technologies, and/or other related data.

Typically, users, which may be people and/or other systems, may engage information technology systems (e.g., computers) to facilitate information processing. In turn, computers employ processors to process information; such processors 1703 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1729 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the DIAP controller 1701 may be connected to and/or communicate with entities such as, but not limited to: one or more users from peripheral devices 1712 (e.g., user input devices 1711); an optional cryptographic processor device 1728; and/or a communications network 1713.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The DIAP controller 1701 may be based on computer systems that may comprise, but are not limited to, components such as: a computer systemization 1702 connected to memory 1729.

Computer Systemization

A computer systemization 1702 may comprise a clock 1730, central processing unit ("CPU(s)" and/or "processor(s)" (these terms are used interchangeable throughout the disclosure unless noted to the contrary)) 1703, a memory 1729 (e.g., a read only memory (ROM) 1706, a random access memory (RAM) 1705, etc.), and/or an interface bus 1707, and most frequently, although not necessarily, are all interconnected and/or communicating through a system bus 1704 on one or more (mother) board(s) 1702 having conductive and/or otherwise transportive circuit pathways through which instructions (e.g., binary encoded signals) may travel to effectuate communications, operations, storage, etc. The computer systemization may be connected to a power source 1786; e.g., optionally the power source may be internal. Optionally, a cryptographic processor 1726 may be connected to the system bus. In another embodiment, the cryptographic processor, transceivers (e.g., ICs) 1774, and/or sensor array (e.g., accelerometer, altimeter, ambient light, barometer, global positioning system (GPS) (thereby allowing DIAP controller to determine its location), gyroscope, magnetometer, pedometer, proximity, ultra-violet sensor, etc.) 1773, May be connected as either internal and/or external peripheral devices 1712 via the interface bus I/O 1708 (not pictured) and/or directly via the interface bus 1707. In turn, the transceivers may be connected to antenna(s) 1775, thereby effectuating wireless transmission and reception of various communication and/or sensor protocols; for example the antenna(s) may connect to various transceiver chipsets (depending on deployment needs), including: Broadcom BCM4329FKUBG transceiver chip (e.g., providing 802.11n, Bluetooth 2.1+EDR, FM, etc.); a Broadcom BCM4752 GPS receiver with accelerometer, altimeter, GPS, gyroscope, magnetometer; a Broadcom BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom BCM43341 transceiver chip (e.g., providing 2G, 3G and 4G LTE cellular communications; 802.11 g/, Bluetooth 4.0, near field communication (NFC), FM radio); an Infineon Technologies X-Gold 618-PMB9800 transceiver chip (e.g., providing 2G/3G HSDPA/HSUPA communications); a MediaTek NIT6620 transceiver chip (e.g., providing 802.11a/ac/b/g/n, Bluetooth 4.0 LE, FM, GPS; a Lapis Semiconductor ML8511 UV sensor; a maxim integrated MAX44000 ambient light and infrared proximity sensor; a Texas Instruments WiLink WL1283 transceiver chip (e.g., providing 802.11n, Bluetooth 3.0, FM, GPS); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large super-computer(s) and mainframe(s) computers, down to mini computers, servers, desktop computers, laptops, thin clients (e.g., Chromebooks), netbooks, tablets (e.g., Android, iPads, and Windows tablets, etc.), mobile smartphones (e.g., Android, iPhones, Nokia, Palm and Windows phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; Apple's A series of processors (e.g., A5, A6, A7, A8, etc.); ARM's application, embedded and secure processors; IBM and/or Motorola's DragonBall and PowerPC; IBM's and Sony's Cell processor; Intel's 80X86 series (e.g., 80386, 80486), Pentium, Celeron, Core (2) Duo, i series (e.g., i3, i5, i7, etc.), Itanium, Xeon, and/or XScale; Motorola's 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the DIAP controller and beyond through various interfaces. Should processing requirements dictate a greater amount speed and/or capacity, distributed processors (e.g., see Distributed DIAP below), mainframe, multi-core, parallel, and/or super-computer architectures May similarly be employed. Alternatively, should deployment requirements dictate greater portability, smaller mobile devices (e.g., Personal Digital Assistants (PDAs)) may be employed.

Depending on the particular implementation, features of the DIAP may be achieved by implementing a microcontroller such as CAST's R8051XC2 microcontroller; Intel's MCS 51 (i.e., 8051 microcontroller); and/or the like. Also, to implement certain features of the DIAP, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the DIAP component collection (distributed or otherwise) and/or features may be implemented via the microprocessor and/or via embedded components; e.g., via ASIC, coprocessor, DSP, FPGA, and/or the like. Alternately, some implementations of the DIAP may be implemented with embedded components that are configured and used to achieve a variety of features or signal processing.

Depending on the particular implementation, the embedded components may include software solutions, hardware solutions, and/or some combination of both hardware/software solutions. For example, DIAP features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the DIAP features. A hierarchy of programmable interconnects allow logic blocks to be interconnected as needed by the DIAP system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the DIAP may be developed on regular FPGAs and then migrated into a fixed version that more resembles ASIC implementations. Alternate or coordinating implementations may migrate DIAP controller features to a final ASIC instead of or in addition to FPGAs. Depending on the implementation all of the aforementioned embedded components and microprocessors may be considered the "CPU" and/or "processor" for the DIAP.

Power Source

The power source 1786 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1786 is connected to at least one of the interconnected subsequent components of the DIAP thereby providing an electric current to all subsequent components. In one example, the power source 1786 is connected to the system bus component 1704. In an alternative embodiment, an outside power source 1786 is provided through a connection across the I/O 1708 interface. For example, a USB and/or IEEE 1394 connection carries both data and power across the connection and is therefore a suitable source of power.

Interface Adapters

Interface bus (ses) 1707 may accept, connect, and/or communicate to a number of interface adapters, conventionally although not necessarily in the form of adapter cards, such as but not limited to: input output interfaces (I/O) 1708, storage interfaces 1709, network interfaces 1710, and/or the like. Optionally, cryptographic processor interfaces 1727 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E) ISA), Micro Channel Architecture (MCA), NuBus, Peripheral Component Interconnect (Extended) (PCI (X)), PCI Express, Personal Computer Memory Card International Association (PCMCIA), and/or the like.

Storage interfaces 1709 may accept, communicate, and/or connect to a number of storage devices such as, but not limited to: storage devices 1714, removable disc devices, and/or the like. Storage interfaces may employ connection protocols such as, but not limited to: (Ultra) (Serial) Advanced Technology Attachment (Packet Interface) ((Ultra) (Serial) ATA (PI)), (Enhanced) Integrated Drive Electronics ((E) IDE), Institute of Electrical and Electronics Engineers (IEEE) 1394, fiber channel, Small Computer Systems Interface (SCSI), Universal Serial Bus (USB), and/or the like.

Network interfaces 1710 may accept, communicate, and/or connect to a communications network 1713. Through a communications network 1713, the DIAP controller is accessible through remote clients 1733*b* (e.g., computers with web browsers) by users 1733*a*. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed DIAP below), architectures may similarly be employed to pool, load balance, and/or otherwise decrease/increase the communicative bandwidth required by the DIAP controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 1710 may be used to engage with various communications network types 1713. For example, multiple network interfaces may be employed to allow for the communication over broadcast, multicast, and/or unicast networks.

Input Output interfaces (I/O) 1708 may accept, communicate, and/or connect to user, peripheral devices 1712 (e.g., input devices 1711), cryptographic processor devices 1728, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA (+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

Peripheral devices 1712 may be connected and/or communicate to I/O and/or other facilities of the like such as network interfaces, storage interfaces, directly to the interface bus, system bus, the CPU, and/or the like. Peripheral devices may be external, internal and/or part of the DIAP controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 1711 often are a type of peripheral device 512 (see above) and May include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the DIAP controller may be embodied as an embedded, dedicated, and/or monitor-less (i.e., headless) device, wherein access would be provided over a network interface connection.

Cryptographic units such as, but not limited to, microcontrollers, processors 1726, interfaces 1727, and/or devices 1728 may be attached, and/or communicate with the DIAP controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetY and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 1729. However, memory is a fungible technology and resource, thus, any number of memory embodiments may be employed in lieu of or in concert with one another. It is to be understood that the DIAP controller and/or a computer systemization may employ various forms of memory 1729. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 1729 will include ROM 1706, RAM 1705, and a storage device 1714. A storage device 1714 may be any conventional computer system storage. Storage devices may include: an array of devices (e.g., Redundant Array of Independent Disks (RAID)); a drum; a (fixed and/or removable) magnetic disk drive; a magneto-optical drive; an optical drive (i.e., Blu-eray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 1729 may contain a collection of program and/or database components and/or data such as, but not limited to: operating system component(s) 1715 (operating system); information server component(s) 1716 (information server); user interface component(s) 1717 (user interface); Web browser component(s) 1718 (Web browser); database(s) 1719; mail server component(s) 1721; mail client component(s) 1722; cryptographic server component(s) 1720 (cryptographic server); the DIAP component(s) 1735; and/or the like (i.e., collectively a component collection). These components may be stored and accessed from the storage devices and/or from storage devices accessible through an interface bus. Although non-conventional program components such as those in the component collection, typically, are stored in a local storage device 1714, they may also be loaded and/or stored in memory such as: peripheral devices, RAM, remote storage facilities through a communications network, ROM, various forms of memory, and/or the like.

Operating System

The operating system component 1715 is an executable program component facilitating the operation of the DIAP controller. Typically, the operating system facilitates access of I/O, network interfaces, peripheral devices, storage devices, and/or the like. The operating system may be a highly fault tolerant, scalable, and secure system such as: Apple's Macintosh OS X (Server); AT&T Plan 9; Be OS; Blackberry's QNX; Google's Chrome; Microsoft's Windows 7/8; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/Mobile/NT/Vista/XP (Server), Palm OS, and/or the like. Additionally, for robust mobile deployment applications, mobile operating systems may be used, such as: Apple's iOS; China Operating System COS; Google's Android; Microsoft Windows RT/Phone; Palm's WebOS; Samsung/Intel's Tizen; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the DIAP controller to communicate with other entities through a communications network 1713. Various communication protocols may be used by the DIAP controller as a subcarrier transport mechanism for interaction, such as, but not limited to: multicast, TCP/IP, UDP, unicast, and/or the like.

Information Server

An information server component 1716 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C#and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the DIAP controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the DIAP database 1719, operating systems, other program components, user interfaces, Web browsers, and/or the like.

Access to the DIAP database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the DIAP. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the DIAP as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple's iOS, Macintosh Operating System's Aqua; IBM's OS/2; Google's Chrome (e.g., and other webbrowser/cloud based client OSs); Microsoft's Windows varied UIs 2000/2003/3.1/95/98/CE/Millenium/Mobile/NT/Vista/XP (Server) (i.e., Aero, Surface, etc.); Unix's Y-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D) HTML, FLASH, Java, JavaScript, etc. interface libraries such as, but not limited to, Dojo, jQuery (UI), MooTools, Prototype, script.aculo.us, SWFObject, Yahoo! User Interface, any of which may be used and) provide a baseline and means of accessing and displaying information graphically to users.

A user interface component 1717 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1718 is a stored program component that is executed by a CPU. The Web browser may be a conventional hypertext viewing application such as Apple's (mobile) Safari, Google's Chrome, Microsoft Internet Explorer, Mozilla's Firefox, Netscape Navigator, and/or the like. Secure Web browsing may be supplied with 128 bit (or greater) encryption by way of HTTPS, SSL, and/or the like. Web browsers allowing for the execution of program components through facilities such as ActiveX, AJAX, (D) HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the DIAP enabled nodes. The combined application may be nugatory on systems employing standard Web browsers.

Mail Server

A mail server component 1721 is a stored program component that is executed by a CPU 1703. The mail server may be a conventional Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C#and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the DIAP. Alternatively, the mail server component may be distributed out to mail service providing entities such as Google's cloud services (e.g., Gmail and notifications may alternatively be provided via messenger services such as AOL's Instant Messenger, Apple's iMessage, Google Messenger, SnapChat, etc.).

Access to the DIAP mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1722 is a stored program component that is executed by a CPU 1703. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client May communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1720 is a stored program component that is executed by a CPU 1703, cryptographic processor 1726, cryptographic processor interface 1727, cryptographic processor device 1728, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (NID5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the DIAP may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the DIAP component to engage in secure transactions if so desired. The cryptographic component facilitates the secure accessing of resources on the DIAP and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The DIAP Database

The DIAP database component 1719 may be embodied in a database and its stored data. The database is a stored program component, which is executed by the CPU; the stored program component portion configuring the CPU to process the stored data. The database may be a conventional, fault tolerant, relational, scalable, secure database such as MySQL, Oracle, Sybase, etc. may be used. Additionally, optimized fast memory and distributed databases such as IBM's Netezza, MongoDB's MongoDB, opensource Hadoop, opensource VoltDB, SAP's Hana, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the DIAP database may be implemented using various standard data-structures, such as an array, hash, (linked) list, struct, structured text file (e.g., ANIL), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the DIAP database is implemented as a data-structure, the use of the DIAP database 1719 may be integrated into another component such as the DIAP component 1735. Also, the database may be implemented as a mix of data structures, objects, and relational structures. Databases may be consolidated and/or distributed in countless variations (e.g., see Distributed DIAP below). Portions of databases, e.g., tables, may be exported and/or imported and thus decentralized and/or integrated.

In one embodiment, the database component 1719 includes several tables 1719*a-l*: An accounts table 1719*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, link WalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 1719*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table May support and/or track multiple entity accounts on a DIAP);

An devices table 1719*c* includes fields such as, but not limited to: deviceID, sensorIDs, accountID, assetIDs, paymentIDs, device Type, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppInstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 1719*d* includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, app Access Privileges, appPreferences, appRestrictions, portNum, access_API_call, linked_wallets_list, and/or the like;

An assets table 1719*e* includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, asset Price, asset Value, assetManufactuer, assetModelNo, assetSerialNo, assetLocation, assetAddress, assetState, assetZIPcode, assetState, assetCountry, assetEmail, assetIPaddress, assetURLaccessCode, assetOwner AccountID, subscriptionIDs, assetAuthroizationCode, assetAccessPrivileges, assetPreferences, assetRestrictions, assetAPI, assetAPIconnection Address, and/or the like;

A payments table 1719*f* includes fields such as, but not limited to: paymentID, accountID, userID, paymentType, paymentAccountNo, paymentAccountName, paymentAccountAuthorizationCodes, paymentExpirationDate, paymentCCV, paymentRoutingNo, paymentRouting Type, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 1719*g* includes fields such as, but not limited to: transactionID, accountID, assetIDs, deviceIDs, paymentIDs, transactionIDs, userID, merchantID, transaction Type, transactionDate, transactionTime, transactionAmount, transactionQuantity, productType, transactionDetails, productsList, product Title, productsSummary, productParamsList, transactionNo, transactionAccessPrivileges, transactionPreferences, transaction Restrictions, merchantAuthKey, merchantAuthCode, and/or the like;

An merchants table 1719*h* includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table 1719*i* includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetwork XchangeID, adNetworkXchangeName, adNetworkXchangeCost, adNetwork XchangeMetricType (e.g., CPA, CPC, CPM, CTR, etc.), adNetworkXchangeMetricValue, adNetworkXchangeServer, adNetworkXchangePortNumber, publisherID, publisher Address, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

A clean data table 1719*j* includes fields such as, but not limited to: a cleanDataID, cleanDataColumnNames, cleanData Values, cleanData AuditData, and/or the like;

A metadata data sets table 1719*k* includes fields such as, but not limited to: a datasetID, datasetProperties, datasetTables, datasetTablesProperties, datasetColumns, datasetColumnsProperties, and/or the like;

A visualization modules table 17191 includes fields such as, but not limited to: a moduleID, module Visualizations, module VisualizationsTypes, module VisualizationsInputs, module VisualizationsColumnsForInputs, module VisualizationsFilterSettings, module VisualizationsOutputSettings, and/or the like.

In one embodiment, the DIAP database may interact with other database systems. For example, employing a distributed database system, queries and data access by search DIAP component may treat the combination of the DIAP database, an integrated data security layer database as a single database entity (e.g., see Distributed DIAP below).

In one embodiment, user programs may contain various user interface primitives, which may serve to update the DIAP. Also, various accounts may require custom database tables depending upon the environments and the types of clients the DIAP may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1719*a*-1. The DIAP may be configured to keep track of various settings, inputs, and parameters via database controllers.

The DIAP database may communicate to and/or with other components in a component collection, including itself, and/or facilities of the like. Most frequently, the DIAP database communicates with the DIAP component, other program components, and/or the like. The database may contain, retain, and provide information regarding other nodes and data.

The DIAPs

The DIAP component 1735 is a stored program component that is executed by a CPU. In one embodiment, the DIAP component incorporates any and/or all combinations of the aspects of the DIAP that was discussed in the previous figures. As such, the DIAP affects accessing, obtaining and the provision of information, services, transactions, and/or the like across various communications networks. The features and embodiments of the DIAP discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the DIAP's features and facilities, and in many cases reduce the costs, energy consumption/requirements, and extend the life of DIAP's underlying infrastructure; this has the added benefit of making the DIAP more reliable. Similarly, many of the features and mechanisms are designed to be easier for users to use and access, thereby broadening the audience that may enjoy/employ and exploit the feature sets of the DIAP; such ease of use also helps to increase the reliability of the DIAP. In addition, the feature sets include heightened security as noted via the Cryptographic components 1720, 1726, 1728 and throughout, making access to the features and data more reliable and secure The DIAP transforms file upload request, external data request, and analytics request inputs, via DIAP components (e.g., DI, AE), into clean data, metadata data sets, visualization module output, and audit notification outputs.

The DIAP component enabling access of information between nodes may be developed by employing standard development tools and languages such as, but not limited to: Apache components, Assembly, ActiveX, binary executables, (ANSI) (Objective-) C (++), C#and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D) HTML; Dojo, Java; JavaScript; jQuery (UI); MooTools; Prototype; script.aculo.us; Simple Object Access Protocol (SOAP); SWFObject; Yahoo! User Interface; and/or the like), WebObjects, and/or the like. In one embodiment, the DIAP server employs a cryptographic server to encrypt and decrypt communications. The DIAP component may communicate to and/or with other components in a component collection, including itself, and/or facilities of the like. Most frequently, the DIAP component communicates with the DIAP database, operating systems, other program components, and/or the like. The DIAP may contain, communicate, generate, obtain, and/or provide program component, system, user, and/or data communications, requests, and/or responses.

Distributed DIAPs

The structure and/or operation of any of the DIAP node controller components May be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through standard data processing and/or development techniques. Multiple instances of any one of the program components in the program component collection May be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the DIAP controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services, Microsoft Azure, Hewlett Packard Helion, IBM Cloud services allow for DIAP controller and/or DIAP component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D) COM), (Distributed) Object Linking and Embedding ((D) OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, NAIL, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the DIAP controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<? PHP
  header ('Content-Type: text/plain');
  //set ip address and port to listen to for incoming data
  $address= '192.168.0. 100'; 7
  $port=255;
  //create a server-side SSL socket, listen for/accept incoming communication
  $sock=socket_create (AF_INET, SOCK_STREAM, 0);
  socket_bind ($sock, $address, $port) or die ('Could not bind to address');
  socket_listen ($sock); 13
  $client=socket_accept ($sock);
  //read input data from client device in 1024 byte blocks until end of message
  do {18
     $input= " ";
     19 $input=socket_read ($client, 1024);
     $data.=$input;
  } while ($input!= " ");
  //parse data to extract variables
  $obj=json_decode ($data, true);
  //store input data in a database
  mysql_connect ("201.408.185.132", $DBserver, $password);//access database server
  mysql_select ("CLIENT_DB. SQL");//select database to append
  mysql_query ("INSERT INTO UserTable (transmission) VALUES ($data)");//add data to UserTable table in a CLIENT database
  mysql_close ("CLIENT_DB.SQL");//close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/
  index.jsp?topic=/com.ibm.IBMDI.doc/
  referenceguide295.htm and other parser implementations:

http://publib.boulder.ibm.com/infocenter/tivihelp/v2r1/
index.jsp?topic=/com.ibm.IBMDI.doc/
referenceguide259.htm all of which are hereby expressly incorporated by reference.

Additional embodiments may include:

1. An audit trail apparatus, comprising:
a memory;
a component collection in the memory, including:
a data ingest component;
a processor disposed in communication with the memory, and configured to issue a plurality of processing instructions from the component collection stored in the memory,
wherein the processor issues instructions from the data ingest component, stored in the memory, to:
obtain, via at least one processor, a data ingest request from a user via a user interface;
determine, via at least one processor, a data file to ingest based on the data ingest request;
process, via at least one processor, the data file to generate a clean file;
generate, via at least one processor, a unique table name for data in the clean file;
generate, via at least one processor, column names for data columns in the clean file;
generate, via at least one processor, a command to create a database table with the generated unique table name and the generated column names, and a command to load data in the clean file into the database table;
facilitate, via at least one processor, creating the database table and loading data in the clean file into the database table using the generated commands;
generate, via at least one processor, a metadata data set identifier for a metadata data set;
determine, via at least one processor, table columns from the database table to include into the metadata data set;
generate, via at least one processor, the metadata data set, wherein the metadata data set links the determined columns from the database table to user interface elements of an analytics engine, and wherein the determined columns are associated with audit trail data via at least the metadata data set identifier.

2. The apparatus of embodiment 1, wherein the data ingest request further specifies whether data in the data file should be associated with a new metadata data set or added to an existing metadata data set.

3. The apparatus of embodiment 1, wherein the data file is a flat file.

4. The apparatus of embodiment 1, wherein the data file is unstructured JSON data from a web-based API.

5. The apparatus of embodiment 1, wherein the data file is a direct SQL extract of data.

6. The apparatus of embodiment 1, wherein the data file is the output of a report executed by a data management platform.

7. The apparatus of embodiment 1, wherein instructions to process the data file further include instructions to perform any of: detect column structure, determine column attributes, detect anomalous data values.

8. The apparatus of embodiment 1, wherein instructions to generate the unique table name further include instructions to:

determine a table name associated with the data file based on either the data file's filename or the data file's parameter;
generate an ingestion timestamp; and
generate the unique table name by appending the generated timestamp to the determined table name.

9. The apparatus of embodiment 1, wherein instructions to generate column names for the data columns in the clean file further include instructions to generate human-readable captions for the data columns in the clean file.

10. The apparatus of embodiment 1, wherein the metadata data set identifier is a globally unique identifier.

11. The apparatus of embodiment 1, wherein the user specifies table columns from the database table to include into the metadata data set via a user interface.

12. The apparatus of embodiment 1, wherein the metadata data set is a JSON file.

13. The apparatus of embodiment 1, wherein each of the determined columns from the database table is a selectable user interface element in the analytics engine.

14. The apparatus of embodiment 1, wherein the audit trail data includes an identifier of the user.

15. The apparatus of embodiment 1, wherein the audit trail data includes a parameter associated with the data ingest request, wherein the parameter is selected by the user.

16. A processor-readable audit trail non-transient physical medium storing processor-executable components, the components, comprising:
a component collection stored in the medium, including:
a data ingest component;
wherein the data ingest component, stored in the medium, includes processor-issuable instructions to:
obtain, via at least one processor, a data ingest request from a user via a user interface;
determine, via at least one processor, a data file to ingest based on the data ingest request;
process, via at least one processor, the data file to generate a clean file;
generate, via at least one processor, a unique table name for data in the clean file;
generate, via at least one processor, column names for data columns in the clean file;
generate, via at least one processor, a command to create a database table with the generated unique table name and the generated column names, and a command to load data in the clean file into the database table;
facilitate, via at least one processor, creating the database table and loading data in the clean file into the database table using the generated commands;
generate, via at least one processor, a metadata data set identifier for a metadata data set;
determine, via at least one processor, table columns from the database table to include into the metadata data set;
generate, via at least one processor, the metadata data set, wherein the metadata data set links the determined columns from the database table to user interface elements of an analytics engine, and wherein the determined columns are associated with audit trail data via at least the metadata data set identifier.

17. The medium of embodiment 16, wherein the data ingest request further specifies whether data in the data file should be associated with a new metadata data set or added to an existing metadata data set.

18. The medium of embodiment 16, wherein the data file is a flat file.

19. The medium of embodiment 16, wherein the data file is unstructured JSON data from a web-based API.

20. The medium of embodiment 16, wherein the data file is a direct SQL extract of data.

21. The medium of embodiment 16, wherein the data file is the output of a report executed by a data management platform.

22. The medium of embodiment 16, wherein instructions to process the data file further include instructions to perform any of: detect column structure, determine column attributes, detect anomalous data values.

23. The medium of embodiment 16, wherein instructions to generate the unique table name further include instructions to:
determine a table name associated with the data file based on either the data file's filename or the data file's parameter;
generate an ingestion timestamp; and
generate the unique table name by appending the generated timestamp to the determined table name.

24. The medium of embodiment 16, wherein instructions to generate column names for the data columns in the clean file further include instructions to generate human-readable captions for the data columns in the clean file.

25. The medium of embodiment 16, wherein the metadata data set identifier is a globally unique identifier.

26. The medium of embodiment 16, wherein the user specifies table columns from the database table to include into the metadata data set via a user interface.

27. The medium of embodiment 16, wherein the metadata data set is a JSON file.

28. The medium of embodiment 16, wherein each of the determined columns from the database table is a selectable user interface element in the analytics engine.

29. The medium of embodiment 16, wherein the audit trail data includes an identifier of the user.

30. The medium of embodiment 16, wherein the audit trail data includes a parameter associated with the data ingest request, wherein the parameter is selected by the user. 16

31. A processor-implemented audit trail system, comprising:
a data ingest component means, to:
obtain, via at least one processor, a data ingest request from a user via a user interface;
determine, via at least one processor, a data file to ingest based on the data ingest request;
process, via at least one processor, the data file to generate a clean file;
generate, via at least one processor, a unique table name for data in the clean file;
generate, via at least one processor, column names for data columns in the clean file;
generate, via at least one processor, a command to create a database table with the generated unique table name and the generated column names, and a command to load data in the clean file into the database table;
facilitate, via at least one processor, creating the database table and loading data in the clean file into the database table using the generated commands; generate, via at least one processor, a metadata data set identifier for a metadata data set;
determine, via at least one processor, table columns from the database table to include into the metadata data set;
generate, via at least one processor, the metadata data set, wherein the metadata data set links the determined columns from the database table to user interface elements of an analytics engine, and wherein the determined columns are associated with audit trail data via at least the metadata data set identifier.

32. The system of embodiment 31, wherein the data ingest request further specifies whether data in the data file should be associated with a new metadata data set or added to an existing metadata data set.

33. The system of embodiment 31, wherein the data file is a flat file.

34. The system of embodiment 31, wherein the data file is unstructured JSON data from a web-based API.

35. The system of embodiment 31, wherein the data file is a direct SQL extract of data.

36. The system of embodiment 31, wherein the data file is the output of a report executed by a data management platform.

37. The system of embodiment 31, wherein means to process the data file further include means to perform any of: detect column structure, determine column attributes, detect anomalous data values.

38. The system of embodiment 31, wherein means to generate the unique table name further include means to:
determine a table name associated with the data file based on either the data file's filename or the data file's parameter;
generate an ingestion timestamp; and
generate the unique table name by appending the generated timestamp to the determined table name.

39. The system of embodiment 31, wherein means to generate column names for the data columns in the clean file further include means to generate human-readable captions for the data columns in the clean file.

40. The system of embodiment 31, wherein the metadata data set identifier is a globally unique identifier.

41. The system of embodiment 31, wherein the user specifies table columns from the database table to include into the metadata data set via a user interface.

42. The system of embodiment 31, wherein the metadata data set is a JSON file. 43. The system of embodiment 31, wherein each of the determined columns from the database table is a selectable user interface element in the analytics engine.

44. The system of embodiment 31, wherein the audit trail data includes an identifier of the user.

45. The system of embodiment 31, wherein the audit trail data includes a parameter associated with the data ingest request, wherein the parameter is selected by the user.

46. A processor-implemented audit trail method, comprising:
executing processor-implemented data ingest component instructions to:
obtain, via at least one processor, a data ingest request from a user via a user interface;
determine, via at least one processor, a data file to ingest based on the data ingest request;
process, via at least one processor, the data file to generate a clean file;
generate, via at least one processor, a unique table name for data in the clean file;
generate, via at least one processor, column names for data columns in the clean file;
generate, via at least one processor, a command to create a database table with the generated unique table name and the generated column names, and a command to load data in the clean file into the database table;

facilitate, via at least one processor, creating the database table and loading data in the clean file into the database table using the generated commands;

generate, via at least one processor, a metadata data set identifier for a metadata data set;

determine, via at least one processor, table columns from the database table to include into the metadata data set;

generate, via at least one processor, the metadata data set, wherein the metadata data set links the determined columns from the database table to user interface elements of an analytics engine, and wherein the determined columns are associated with audit trail data via at least the metadata data set identifier.

47. The method of embodiment 46, wherein the data ingest request further specifies whether data in the data file should be associated with a new metadata data set or added to an existing metadata data set.

48. The method of embodiment 46, wherein the data file is a flat file.

49. The method of embodiment 46, wherein the data file is unstructured JSON data from a web-based API.

50. The method of embodiment 46, wherein the data file is a direct SQL extract of data.

51. The method of embodiment 46, wherein the data file is the output of a report executed by a data management platform.

52. The method of embodiment 46, wherein instructions to process the data file further include instructions to perform any of: detect column structure, determine column attributes, detect anomalous data values.

53. The method of embodiment 46, wherein instructions to generate the unique table name further include instructions to:

determine a table name associated with the data file based on either the data file's filename or the data file's parameter;

generate an ingestion timestamp; and generate the unique table name by appending the generated timestamp to the determined table name.

54. The method of embodiment 46, wherein instructions to generate column names for the data columns in the clean file further include instructions to generate human-readable captions for the data columns in the clean file.

55. The method of embodiment 46, wherein the metadata data set identifier is a globally unique identifier. 17

56. The method of embodiment 46, wherein the user specifies table columns from the database table to include into the metadata data set via a user interface.

57. The method of embodiment 46, wherein the metadata data set is a JSON file.

58. The method of embodiment 46, wherein each of the determined columns from the database table is a selectable user interface element in the analytics engine.

59. The method of embodiment 46, wherein the audit trail data includes an identifier of the user.

60. The method of embodiment 46, wherein the audit trail data includes a parameter associated with the data ingest request, wherein the parameter is selected by the user.

61. A variable data source ingest and audit apparatus, comprising:
a memory;
a component collection in the memory, including:
  a data ingest user interface component,
  an dynamic and variable ingest component,
  an dynamic and variable ingest audit component;
a processor disposed in communication with the memory, and configured to issue a plurality of processing instructions from the component collection stored in the memory,
  wherein the processor issues instructions from the data ingest user interface component, stored in the memory, to:
    obtain a data source selection identifier via data ingest user interface component;
  wherein the processor issues instructions from the dynamic and variable ingest component, stored in the memory, to:
    obtain access to a data source via variable ingest component from the data source selection identifier;
    detect the data source's data structural construct, wherein detection includes any of: detecting column structure, clean values, anomalous values;
    clean the detected data source's data structural construct's data values;
    create clean data bucket from the cleaned data source's data structural construct's data values;
    generate a redshift data bucket table from the detected data source's data structural construct's data values;
    execute data definition on the redshift data bucket table;
    generate metadata modules and metadata data sets from the executed redshift data bucket table;
  wherein the processor issues instructions from the dynamic and variable ingest audit component, stored in the memory, to:
    detect data anomalies by examining the executed redshift data bucket table for anomalous values differing from clean data bucket;
    generate a notification for detected data anomalies.

62. A processor-readable variable data source ingest and audit non-transient physical medium storing processor-executable components, the components, comprising:
a component collection stored in the medium, including:
  a data ingest user interface component,
  an dynamic and variable ingest component,
  an dynamic and variable ingest audit component;
  wherein the data ingest user interface component, stored in the medium, includes processor-issuable instructions to:
    obtain a data source selection identifier via data ingest user interface component;
  wherein the dynamic and variable ingest component, stored in the medium, includes processor-issuable instructions to:
    obtain access to a data source via variable ingest component from the data source selection identifier;
    detect the data source's data structural construct, wherein detection includes any of: detecting column structure, clean values, anomalous values;
    clean the detected data source's data structural construct's data values;

create clean data bucket from the cleaned data source's data structural construct's data values;
generate a redshift data bucket table from the detected data source's data structural construct's data values;
execute data definition on the redshift data bucket table;
generate metadata modules and metadata data sets from the executed redshift data bucket table;
wherein the dynamic and variable ingest audit component, stored in the medium, includes processor-issuable instructions to:
detect data anomalies by examining the executed redshift data bucket table for anomalous values differing from clean data bucket;
generate a notification for detected data anomalies.

63. A processor-implemented variable data source ingest and audit system, comprising:
a data ingest user interface component means, to:
obtain a data source selection identifier via data ingest user interface component;
an dynamic and variable ingest component means, to:
obtain access to a data source via variable ingest component from the data source selection identifier;
detect the data source's data structural construct, wherein detection includes any of:
detecting column structure, clean values, anomalous values;
clean the detected data source's data structural construct's data values;
create clean data bucket from the cleaned data source's data structural construct's data values;
generate a redshift data bucket table from the detected data source's data structural construct's data values;
execute data definition on the redshift data bucket table;
generate metadata modules and metadata data sets from the executed redshift data bucket table;
an dynamic and variable ingest audit component means, to:
detect data anomalies by examining the executed redshift data bucket table for anomalous values differing from clean data bucket;
generate a notification for detected data anomalies.

64. A processor-implemented variable data source ingest and audit method, comprising:
executing processor-implemented data ingest user interface component instructions to:
obtain a data source selection identifier via data ingest user interface component;
executing processor-implemented dynamic and variable ingest component instructions to:
obtain access to a data source via variable ingest component from the data source selection identifier;
detect the data source's data structural construct, wherein detection includes any of: detecting column structure, clean values, anomalous values;
clean the detected data source's data structural construct's data values;
create clean data bucket from the cleaned data source's data structural construct's data values;
generate a redshift data bucket table from the detected data source's data structural construct's data values;
execute data definition on the redshift data bucket table;
generate metadata modules and metadata data sets from the executed redshift data bucket table;
executing processor-implemented dynamic and variable ingest audit component instructions to:
detect data anomalies by examining the executed redshift data bucket table for anomalous values differing from clean data bucket;
generate a notification for detected data anomalies.

In order to address various issues and advance the art, the entirety of this application for Variable Data Source Dynamic and Automatic Ingestion and Auditing Platform Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower," "upper," "horizontal," "vertical," "above," "below," "up," "down," "top" and "bottom" as well as derivative thereof (e.g., "horizontally," "downwardly," "upwardly," etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached," "affixed," "connected," "coupled," "interconnected," and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a DIAP individual and/or enterprise user, database configuration and/or relational model, data type, data transmission and/or network framework, syntax structure, and/or the like, various embodiments of the DIAP, may be implemented that enable a great deal of flexibility and customization. For example, aspects of the DIAP may be adapted for application program interfaces (e.g., acting as dynamic inter and intra-programming data ports within a programming development environment and/or at runtime). While various embodiments and discussions of the DIAP have included database technology, however, it is to be understood that the embodiments described herein may be readily configured and/or customized for a wide variety of other applications and/or implementations.

What is claimed is:

1. An audit trail apparatus, comprising:
   at least one memory;
   a component collection stored in the at least one memory;
   any of at least one processor disposed in communication with the at least one memory, the any of at least one processor executing processor-executable instructions from the component collection, storage of the component collection structured with processor-executable instructions comprising:
   obtain a data ingest request from a user via a data ingest user interface;
   determine a data file ingesting based on the data ingest request;
   process the data file generating a clean file;
   generate a distinct table name for data in the clean file;
   generate column names for data columns in the clean file;
   generate a command creating a database table with the generated distinct table name and the generate column names, and a command loading data in the clean file into the database table;
   facilitate creating the database table and loading data in the clean file into the database table using the generated commands;
   generate an alteration tamper detecting metadata data set identifier for an alteration tamper detecting metadata data set;
   determine table columns from the database table including into the alteration tamper detecting metadata data set;
   determine a table name associated with the data file based on either a data file's filename or a data file's parameter;
   generate an ingestion timestamp;
   generate the distinct table name by appending the generated timestamp to the determined table name; and
   generate the alteration tamper detecting metadata data set, in which the alteration tamper detecting metadata data set links the determined columns from the database table to user interface visualization elements of an alteration tamper detecting analytics engine, and in which the determined columns are associated with audit trail data via at least the alteration tamper detecting metadata data set identifier.

2. The apparatus of claim 1, in which the data ingest request further specifies whether data in the data file should be associated with any of: a new metadata data set, added to an existing metadata data set.

3. The apparatus of claim 1, in which the data file is a flat file.

4. The apparatus of claim 1, in which the data file is unstructured JSON data from a web-based API.

5. The apparatus of claim 1, in which the data file is a direct SQL extract of data.

6. The apparatus of claim 1, in which the data file is the output of a report executed by a data management platform.

7. The apparatus of claim 1, in which instructions processing the data file further include instructions performing any of: detect column structure, determine column attributes, detect anomalous data values.

8. The apparatus of claim 1, in which generating column names for the data columns in the clean file further includes generating human-readable captions for the data columns in the clean file.

9. The apparatus of claim 1, in which the alteration tamper detecting metadata data set identifier is a globally distinct identifier.

10. The apparatus of claim 1, in which the user specifies table columns from the database table including into the alteration tamper detecting metadata data set via a user interface.

11. The apparatus of claim 1, in which the alteration tamper detecting metadata data set is a JSON file.

12. The apparatus of claim 1, in which each of the determined columns from the database table is a selectable user interface element in the analytics engine.

13. The apparatus of claim 1, in which the audit trail data includes an identifier of the user.

14. The apparatus of claim 1, in which the audit trail data includes a parameter associated with the data ingest request, in which the parameter is selected by the user.

15. A processor-readable non-transient physical medium storing a component collection, storage of the component collection structured with processor-executable instructions comprising:
   obtain a data ingest request from a user via a user interface;
   determine a data file ingesting based on the data ingest request;
   process the data file generating a clean file;
   generate a distinct table name for data in the clean file;
   generate column names for data columns in the clean file;
   generate a command creating a database table with the generated distinct table name and the generated column names, and a command loading data in the clean file into the database table;
   facilitate creating the database table and loading data in the clean file into the database table using the generated commands;

generate a alteration tamper detecting metadata data set identifier for a alteration tamper detecting metadata data set;
determine table columns from the database table including into the alteration tamper detecting metadata data set;
determine a table name associated with the data file based on either a data file's filename or a data file's parameter;
generate an ingestion timestamp;
generate the distinct table name by appending the generated timestamp to the determined table name; and
generate the metadata data set, in which the alteration tamper detecting metadata data set links the determined columns from the database table to user interface visualization elements of an analytics engine, and in which the determined columns are associated with audit trail data via at least the alteration tamper detecting metadata data set identifier.

16. A processor-implemented audit trail system, comprising:
means to store a component collection;
means to process processor-executable instructions from the component collection, storage of the component collection structured with processor-executable instructions comprising:
obtain a data ingest request from a user via a user interface;
determine a data file ingesting based on the data ingest request;
process the data file generating a clean file;
generate a distinct table name for data in the clean file;
generate column names for data columns in the clean file;
generate a command creating a database table with the generated distinct table name and the generated column names, and a command loading data in the clean file into the database table;
facilitate creating the database table and loading data in the clean file into the database table using the generated commands;
generate a alteration tamper detecting metadata data set identifier for a alteration tamper detecting metadata data set;
determine table columns from the database table including into the alteration tamper detecting metadata data set;
determine a table name associated with the data file based on either a data file's filename or a data file's parameter;
generate an ingestion timestamp;
generate the distinct table name by appending the generated timestamp to the determined table name; and
generate the alteration tamper detecting metadata data set, in which the alteration tamper detecting metadata data set links the determined columns from the database table to user interface visualization elements of an analytics engine, and in which the determined columns are associated with audit trail data via at least the alteration tamper detecting metadata data set identifier.

17. An audit trail process, including processing processor-executable instructions via any of at least one processor from a component collection stored in at least one memory, storage of the component collection structured with processor-executable instructions comprising:
obtain a data ingest request from a user via a user interface;
determine a data file ingesting based on the data ingest request;
process the data file generating a clean file;
generate a distinct table name for data in the clean file;
generate column names for data columns in the clean file;
generate a command creating a database table with the generated distinct table name and the generated column names, and a command loading data in the clean file into the database table;
facilitate creating the database table and loading data in the clean file into the database table using the generated commands;
generate an alteration tamper detecting metadata data set identifier for a alteration tamper detecting metadata data set;
determine table columns from the database table including into the alteration tamper detecting metadata data set;
determine a table name associated with the data file based on either a data file's filename or a data file's parameter;
generate an ingestion timestamp;
generate the distinct table name by appending the generated timestamp to the determined table name; and
generate the alteration tamper detecting metadata data set, in which the alteration tamper detecting metadata data set links the determined columns from the database table to user interface visualization elements of an analytics engine, and in which the determined columns are associated with audit trail data via at least the alteration tamper detecting metadata data set identifier.

\* \* \* \* \*